US012754358B2

(12) United States Patent
Lu et al.

(10) Patent No.: US 12,754,358 B2
(45) Date of Patent: Oct. 6, 2026

(54) OPTICAL COMPENSATION FILMS BASED ON COMBINATIONS OF NEGATIVE BIREFRIGENT AND POSITIVE BIREFRIGENT COMPONENTS

(71) Applicant: Akron Polymer Systems, Inc., Akron, OH (US)

(72) Inventors: Zhikuan Lu, Hudson, OH (US); Lang Hu, Tallmadge, OH (US); Limin Sun, Copley, OH (US)

(73) Assignee: Akron Polymer Systems, Inc., Akron, OH (US)

( * ) Notice: Subject to any disclaimer, the term of this patent is extended or adjusted under 35 U.S.C. 154(b) by 713 days.

(21) Appl. No.: 18/163,352

(22) Filed: Feb. 2, 2023

(65) Prior Publication Data

US 2024/0264352 A1 Aug. 8, 2024

(51) Int. Cl.

*G02B 5/30* (2006.01)
*C08J 5/18* (2006.01)
*C08L 87/00* (2006.01)

(52) U.S. Cl.

CPC .............. *G02B 5/3083* (2013.01); *C08J 5/18* (2013.01); *C08L 87/005* (2013.01); *C08J 2325/06* (2013.01); *C08J 2325/18* (2013.01); *C08J 2387/00* (2013.01); *C08J 2425/06* (2013.01); *C08J 2425/18* (2013.01); *C08J 2453/00* (2013.01); *C08L 2203/16* (2013.01)

(58) Field of Classification Search

CPC ....... G02B 5/3083; C08J 5/18; C08J 2325/06; C08J 2325/18; C08J 2387/00; C08J 2425/06; C08J 2425/18; C08J 2453/00; C08L 87/005; C08L 2203/16

See application file for complete search history.

(56) References Cited

U.S. PATENT DOCUMENTS 5,138,474 A * 8/1992 Arakawa ............. G02F 1/13363 349/120
2005/0221627 A1* 10/2005 Lee ............................ C08J 5/18 359/359
2007/0154654 A1* 7/2007 Greener ................. G02B 5/305 428/1.1
2009/0068380 A1* 3/2009 Zheng ...................... G02B 1/04 526/260
2010/0208181 A1* 8/2010 Fiebranz ............ C09K 19/3402 428/1.31
2018/0052271 A1* 2/2018 Wang .................. G02F 1/13363
2018/0072882 A1* 3/2018 Zheng ...................... C08L 25/18
2021/0278582 A1* 9/2021 Wang ................... G02B 5/3016
2024/0264352 A1* 8/2024 Lu ......................... C08L 87/005

FOREIGN PATENT DOCUMENTS

JP 2022144621 A * 10/2022
KR 20080081007 A * 9/2008 ............... G02B 5/30

OTHER PUBLICATIONS

JP 2022144621 A Machine Translation (Year: 2022).*

* cited by examiner

*Primary Examiner* — Travis M Figg
(74) *Attorney, Agent, or Firm* — Benesch Friedlander Coplan & Aronoff LLP

(57) ABSTRACT

An optical compensation film with unique retardation including a compatible blend of a positive birefringent (C+) component, a negative birefringent (C−) component and a compatibilizing component may be prepared as follows: a block copolymer is prepared containing one of the birefringent materials, for example a negative birefringent material, and a less birefringent component. The copolymer is then blended with the second birefringent material, for example a positive birefringent material to form a compatible blend, even though the two birefringent materials are not compatible. The less birefringent component of the copolymer does not have to be compatible with the birefringent component in the copolymer. These films display unique retardation properties and can be used to improve the performance of optical devices such as liquid crystal displays (LCDs), organic light emitting diode (OLED) displays, in-plane switching mode LCDs (IPS-LCD), 3D glasses, optical switches, and waveguides where controlled light management is desirable.

28 Claims, No Drawings

OPTICAL COMPENSATION FILMS BASED ON COMBINATIONS OF NEGATIVE BIREFRIGENT AND POSITIVE BIREFRIGENT COMPONENTS

TECHNICAL FIELD

This disclosure relates to compensation films with unique optical properties, such as reversed dispersion (RD) C films, RD A films, RD biaxial films, and Z-films with tunable dispersions (including normal dispersion (ND), flat dispersion (FD) and RD) More specifically, this invention relates to optical compensation films based on a combination of negative birefringent and positive birefringent components contained in a single film. These films display unique retardation properties and can be used to improve the performance of optical devices such as liquid crystal displays (LCDs), organic light emitting diode (OLED) displays, 3D glasses, optical switches, and waveguides where controlled light management is desirable. More particularly, the optical compensation films of the present invention are useful in in-plane switching mode LCDs (IPS-LCD) and OLED displays.

BACKGROUND

Polymeric compensation films have been developed and used to improve picture quality in the display industry. Three dimensional refractive indices are used to describe the optical properties of compensation films, with $n_x$ and $n_y$ representing the refractive indices along the two in-plane directions, and $n_z$ representing the refractive index in the out-of-plane direction. In-plane birefringence is defined as $\Delta n_{in\text{-}plane}$=nx−ny, and out-of-plane birefringence is defined as $\Delta n_{ot\text{-}of\text{-}plane}$=nz−(nx+ny)/2. The in-plane retardation Re is defined as Re=d×$\Delta n_{in\text{-}plane}$=d×(nx−ny), and the out-of-plane retardation Rth is defined as Rth=d×$\Delta n_{out\text{-}of\text{-}plane}$=d×(nz−(nx+ny)/2).

By varying the relationships between nx, ny, and nz, different types of compensation films can be prepared. An isotropic film is when nx=ny=nz. An anisotropic film is when these values are not all equal.

An isotropic film is normally obtained by the melt extrusion or annealing of an anisotropic film under suitable conditions.

When nx=ny/nz the film is referred to as a compensation (C) film. This can occur when a polymer, which has unique intrinsic properties, is solution cast to form a film which has nx=ny, thus, $\Delta n_{in\text{-}plane}$ and Re are zero, but $\Delta n_{out\text{-}of\text{-}plane}$ and Rth are not zero. In particular, when nx=ny>nz the film is referred to as a negative C film ($\Delta n_{out\text{-}of\text{-}plane}$ and Rth are negative), and the (polymer) is referred to a negative birefringent material. When a polymer with different unique intrinsic properties is solution cast to form a film where nx=ny<nz the film is referred to as a positive C film ($\Delta n_{out\text{-}of\text{-}plane}$ and Rth are positive), and the material (polymer) is referred to as a positive birefringent material. Biaxial stretching of an isotropic film can also produce a C film. Biaxial stretching of a C film can also be used to produce a higher value of $\Delta n_{out\text{-}of\text{-}plane}$.

When an isotropic film is uniaxial stretched without constraint in the transverse direction (TD), the $\Delta n_{in\text{-}plane}$ and the Re will be no longer be zero. If nx is defined as the stretching direction and ny the TD direction, a negative birefringent material will result in a what is known as a positive A film, with the relationship nx>ny=nz (Re is positive and Rth is negative, and Rth=−Re/2). Similar stretching of an isotropic film of a positive birefringent material will result in a negative A film, with the relationship nx<ny=nz (Re is negative and Rth is positive, and Rth=−Re/2). (Note: In some references, the Re always has a positive or zero value. Thus, the stretching direction is ignored and the relationship between nx and ny is set at nx≥ny. A negative Re is used in this document).

If a C film is stretched uniaxially without constraint, the final film will have the combined properties of A and C films. A negative birefringent material will yield what is referred to as a negative B film, with nx>ny>nz. A positive birefringent material will give what is referred to as a positive B film, with nx<ny<nz. B films can also be obtained by uniaxially stretching with constraint or by unequal biaxial stretching of an isotropic film or a C film.

In addition to isotropic, C, A, and B films, there is one more type of compensation film, a Z film where nx>nz>ny or nx<nz<ny. Z films can be obtained by two-dimensional stretching where one of the stretching directions is perpendicular (normal) to the plane of the film, which is technically difficult and not practical.

A factor Nz is used to describe the relationships between nx, ny, and nz in different types of compensation films. Nz is defined by the equation Nz=−Rth/|Re|+0.5, or when using the nx>ny definition, Nz=(nx−nz)/(nx−ny). Nz=−∞ is a positive C film, Nz<0 is a positive B film; Nz=0 is a negative A film; 0<Nz<1 is a Z film, with Nz=0.5 defined as a perfect Z film; Nz=1 is a positive A film; Nz>1 is a negative B film; Nz=too is a negative C film.

In the text to this point, nx (or ny, nz) has been used as a fixed number, but in a given material, the refractive index is actually a function of wavelength. The format $n^{wavelength\ (\lambda)}$ is used to designate the refractive index at a given wavelength (such as $n^{633nm}$). In regions of the spectrum where the material does not absorb light, the refractive index tends to decrease with increasing wavelength. This is called a "normal dispersion", and several equations have been used to express the dispersion curve, such as Cauchy's equation n(A)=A+B/$\lambda_2$+C/$\lambda^4$+ . . . , and the Sellmeier equation:

$$n^2(\lambda) = 1 + \sum_i \frac{B_i\lambda^2}{\lambda^2 - C_i}$$

(commonly 3 terms are used). In most cases, the birefringence tracts the same dispersion curve as the directional refractive indices (normal dispersion) because the different directional refractive indices generally have similar normal dispersions. When the refractive index (or birefringence) increases with increasing wavelength, it is referred to as a reversed dispersion (RD). If the n (or Δn) does not change with wavelength, it is called a flat dispersion (FD).

C, A and B films with normal dispersions are common and relatively easy to prepare. However, films with reversed birefringence dispersions and Z films (with any type of dispersion) are difficult to prepare and extremely rare. In spite of this, there have been many unsuccessful attempts to prepare Z films as they theoretically provide the best optical performance. For example, reversed dispersion is important to maintain the retardation (in unit of nm) proportional to wavelength, or to keep the retardation (in terms of the ratio to the wavelength, such as a quarter wave plate) not sensitive to the wavelength. In another example, in order to compensate the off angle light leakage of the cross polarizers (or circular polarizers for anti-reflection layers), the retardation film should have the desired in-plane retardation Re, and close to zero out-of-plane retardation Rth to achieve the best performance. This is what is provided by a Z type film.

Although Z compensation films offer tremendous potential in the display industry, the difficulty in obtaining these films has greatly limited their application. Due to their intrinsic properties, most polymer materials (with only one birefringent contributing component) cannot be converted into films with the desired dispersion or Z-film character through in-plane stretching. The combination of two or more birefringent components in the same film is one possible way to solve the problem.

One approach would be to prepare a film from a blend of two or more birefringent polymer components. However, most polymers are incompatible and tend to form hazy films due to phase separation. Thus, they cannot satisfy the requirements of an optical compensation film.

Another approach would be to prepare a copolymer containing different birefringent components. However, this is difficult to do experimentally as the required components are often incompatible and must be prepared by different synthetic techniques. In some cases, even though the copolymer could be prepared on a small scale, it would be impossible to be prepared in large quantities due to the complexity of the synthesis. For example, poly(α,β,β-trifluorostyrene (PTFS), a positive birefringent material, can only be prepared using an emulsion polymerization. There are no known negative birefringent materials that can be formed by this method. Since the polymer does not contain reactive groups, it cannot be attached to another polymer via a condensation reaction.

A third component can been used to improve the compatibility of two incompatible polymers in a polymer blend. The third polymer must be compatible with both polymers and maintain the desired optical properties to make optical grade blend films. Due to this limitation there are very few such systems.

SUMMARY

In an embodiment, an optical compensation film including a positive birefringent component and a negative birefringent component, with a thickness less than 200 um.

In another embodiment, An optical compensation film including a compatible blend of a positive birefringent component, a negative birefringent component and a compatibilizing component.

DETAILED DESCRIPTION

The combination of the negative and positive birefringent components in the same film (single film) provides the opportunity to prepare unique retardation films. Surprisingly, it has been discovered that a compatible blend of a negative birefringent (C−) material and a positive birefringent (C+) material can be prepared in the following manner: First a block copolymer is prepared containing one of the birefringent materials, for example a negative birefringent material, and a less birefringent component. The copolymer is then blended with the second birefringent material, for example a positive birefringent material to form a compatible blend, even though the two birefringent materials are not compatible. Even more surprising, the less birefringent component of the copolymer does not have to be compatible with the birefringent component in the copolymer. However, it must be compatible with the second birefringent material. The first system to demonstrate the unusual compatibility described above was a blend of a block copolymer of an aromatic polyester (PAR) and polymethylmethacrylate (PMMA) (PAR-PMMA) with polycarbonate (PC). The PAR-PMMA was prepared as part of an attempt to enhance the compatibility of a PMMA/PC system. The PAR-PMMA block copolymer and PC homopolymer blend exhibited homogenous properties and maintained transparency.

This approach can be used to make blends with positive and negative birefringence polymers where the relationship between nx, ny, and nz can be tailored to yield previously hard to make compensation films. This approach also allows the dispersion curve of the resultant birefringence to be tailored, however, the two birefringent components have to be carefully selected with regards to their dispersion curves. If the two components have the same dispersion curve, they will cancel each other and one cannot get the desired optical performance. In order to obtain a reversed dispersion, the major retardation (birefringent) contributing component should have a dispersion flatter than that of the minor contributing components.

Components with strong negative birefringence that can be incorporated into block copolymers can be used to make blends that can be converted into thin optical compensation films with unique properties. 6FDA/PFMB is a soluble polyimide (PI) that has been commercialized for negative C applications. This PI (6FDA/PFMB) was used to make PI-PMMA block copolymers that were then blended with PTFS. The blends were then solution cast into clear films that were subsequently stretched. By tuning the PI/PMMA ratio, the PI-PMMA/PTFS ratio and the stretching conditions, RD C+ and RD A−/B+ films were prepared. Due to the dilution effect of PMMA and the partial dispersion cancellation with PTFS, the 6DFA/PFMB based PI-PMMA/PTFS, films prepared from the blends usually needed to be relatively thick in order to reach the target retardation (for example Re=−100 nm or Rth=100 nm). Since a thinner film with the target retardation has the advantage of a lower cost, better flexibility, and easier incorporation into a display stack, the PI structure was varied so as to increase the C− contribution and to reduce the amount of the PMMA component.

Compared to the 6FDA/PFMB PI, PIs made from biphenyl dianhydride (BPDA) and PFMB (BPDA/PFMB) are much stronger negative birefringent materials. The poor solubility of the BPDA/PFMB PI in common solvents makes it very difficult to prepare the corresponding PI-PMMA block copolymers. However, the birefringent contribution of BPDA and solubility contribution of 6FDA can be combined in a PI copolymer (6FDA/BPDA/PFMB, 0.5/0.5/1.0). This copolymer can then be used to prepare the corresponding PI-PMMA block copolymer. The 6FDA/BPDA/PFMB (0.5/0.5/1.0) based PI-PMMA has very good compatibility with PTFS. RD C+ and RD A−/B+ films have been prepared with this system. Most importantly, by carefully tuning the PMMA composition in the PI-PMMA, the PI-PMMA/PTFS weight ratio and the casting/stretching conditions, Z-films can be obtained with FD and RD.

An increase in the BPDA content in the PI (6FDA/BPDA/PFMB) results in a greater negative birefringent contribution. However, the reaction conditions for the PI polymerization and the subsequent PI-PMMA polymerization must be carefully determined in order to effectively carry out the preparation. In this manner, the BPDA content can be increased so that the ratio of 6FDA/BPDA/PFMB is 0.3/0.7/1.0. The PI-PMMA block copolymer obtained with this PI copolymer can be blended with PTFS and converted into unique compensation films (RD C+, RD A−/B+, FD and RD Z films).

It has also been found that materials other than PIs can be used to make the block copolymers which can be converted into compensation films. A block copolymer of poly ether sulfone (PSU), a negative birefringent component, and PMMA, a slightly positive birefringent component, is compatible with PTFS, a positive birefringent material. Even though the PSU block is not compatible with the PMMA block, the block copolymer is compatible with PTFS. Attempts to simply blend the three components resulted in phase separation causing the formation of hazy films. On the other hand, compatible blends of the PSU-PMMA block copolymer with PTFS can used to prepare clear films. Several unique compensation films (RD C+, RD A− and RD B+) were obtained from the PSU-PMMA/PTFS blend using solution casting and stretching.

Additionally, a block copolymer of PAR and PMMA (PAR-PMMA) was found to form a compatible blend with PTFS. Since the PAR structure used was weakly birefringent a compensation film made from this blend would have to be relatively thick.

PTFS is a strong C+ material. Thus, the films of this invention containing PTFS can be quite thin. However, the cost of PTFS is higher than that of common polymers such as PMMA and polystyrene (PS). In fact, PS is a very inexpensive C+ material. However, the birefringent contribution is 1/10 that of PTFS. Thus, a much thicker film is needed to reach the target retardation. For an application without a thickness requirement, PS based films can be used. PI-PS can be prepared and blended with PS homo polymer. The blends can be solution cast into clear films with RD C+ properties when the composition is carefully tuned. These films should be able to form RD A−/B+ and Z-films after stretching under suitable conditions.

In one embodiment of the present invention, there is provided an optical compensation film composition comprising a positive birefringent component and a negative birefringent component, wherein the composition can be converted to unique compensation films, including RD C+, RD A−/B+ and Z-films.

In one embodiment, the compensation film is a RD C+ film, with Rth>50 nm at a thickness no more than 100 um or less than 200 um. The dispersion is RD with Rth450/Rth550 less than 1.0, or less than 0.9, or less than 0.85, or equal to 0.82.

In one embodiment, the compensation film is a RD A−/B+ film, with |Re|>50 nm, and Rth≥|Re|/2 at a thickness no more than 100 um. The dispersion is RD with Re450/Re550 less than 1.0, or less than 0.9, or less than 0.85, or equal to 0.82.

In one embodiment, the compensation film is a FD Z film, with |Re|>50 nm, and |Rth|<|Re|/2 at a thickness no more than 100 um. The dispersion Re450/Re550 is in the range of 0.98-1.02, or in the range of 0.99-1.01, or equal to 1.00.

In one embodiment, the compensation film is a RD Z film, with |Re|>50 nm, and |Rth|<|Re|/2 at a thickness no more than 100 um. The dispersion Re450/Re550 is less than 1.0, or less than 0.9, or less than 0.85, or equal to 0.82.

In one embodiment, the compensation film is a RD Z film, with |Re|>50 nm, and |Rth|<10 nm at a thickness no more than 100 um. The dispersion is RD with Re450/Re550 less than 1.0, or less than 0.9, or less than 0.85, or equal to 0.82.

In another embodiment, the positive birefringent component and the negative birefringent component are incorporated on two different compatible polymers, which are blended and the blend cast into film.

In another embodiment, the positive birefringent component and the negative birefringent component are incorporated in a block copolymer.

In another embodiment, the positive birefringent component and the negative birefringent component are not compatible, and a third component is used to improve the compatibility. A compatible blend is then used to prepare a clear optical film.

In another embodiment, the positive birefringent component is selected from PTFS, PS, PMMA, or any other compatible polymer with positive birefringence.

The positive component of the present invention may be a homo polymer or a copolymer. A homo polymer may be prepared by polymerization of a substituted fluorine-containing monomer, styrene or MMA. A copolymer may be prepared by the copolymerization of the substituted fluorine-containing monomers with one or more of ethylenically unsaturated monomers. Examples of ethylenically unsaturated monomers include, but not limited to, α,β,β-trifluorostyrene, α,β-difluorostyrene, β,β-difluorostyrene, α-fluorostyrene, and β-fluorostyrene, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethyolpropyl triacrylate, styrene, α-methyl styrene, nitrostyrene, bromostyrene, iodostyrene, cyanostyrene, chlorostyrene, 4-t-butylstyrene, 4-methylstyrene, vinyl biphenyl, vinyl triphenyl, vinyl toluene, chloromethyl styrene, acrylic acid, methacrylic acid, itaconic acid, crotonic acid, maleic anhydride, tetrafluoroethylene (and other fluoroethylenes), glycidyl methacrylate, carbodiimide methacrylate, C1-C18 alkyl crotonates, di-n-butyl maleate, di-octylmaleate, allyl methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl(meth) acrylate, methacrylamide, acrylamide, butyl acrylamide, ethyl acrylamide, diacetoneacrylamide, butadiene, vinyl ester monomers, vinyl(meth)acrylates, isopropenyl(meth) acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea. Further monomers are described in The Brandon Associates, 2nd edition, 1992 Merrimack, N.H., and in Polymers and Monomers, the 1966-1997 Catalog from Polyscience, Inc., Warrington, Pa., U.S.A.

In another embodiment, the negative birefringent component is selected from PAR, PSU, PI, or any other compatible negative birefringent polymer.

In another embodiment, the negative birefringent component is incorporated in a block copolymer. Suitable block copolymers may include PAR-PMMA, PSU-PMMA, PI-PMMA, PAR-PS, PSU-PS and PI-PS.

The compatibilizing component of the block copolymer in the present invention may be a homo polymer or a copolymer. The homo polymer may be prepared by polymerization of styrene or MMA. The copolymer may be prepared by copolymerization of the substituted fluorine-containing monomers with one or more of ethylenically unsaturated monomers. Examples of ethylenically unsaturated monomers include, but not limited to, α,β,β-trifluorostyrene, α,β-difluorostyrene, β,β-difluorostyrene, α-fluorostyrene, and β-fluorostyrene, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethyolpropyl triacrylate, styrene, α-methyl styrene, nitrostyrene, bromostyrene, iodostyrene, cyanostyrene, chlorostyrene, 4-t-butylstyrene, 4-methylstyrene, vinyl biphenyl, vinyl triphenyl, vinyl toluene, chloromethyl styrene, acrylic acid, methacrylic acid, itaconic acid, crotonic acid, maleic anhydride, tetrafluoroethylene (and other fluoroethylenes), glycidyl methacrylate, carbodiimide methacrylate, C1-C18 alkyl crotonates, di-n-butyl maleate, di-octylmaleate, allyl methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl(meth) acrylate, methacrylamide, acrylamide, butyl acrylamide, ethyl acrylamide, diacetoneacrylamide, butadiene, vinyl ester monomers, vinyl(meth)acrylates, isopropenyl(meth) acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamido-ethylethylene urea. Further monomers are described in The Brandon Associates, 2nd edition, 1992 Merrimack, N.H., and in Polymers and Monomers, the 1966-1997 Catalog from Polyscience, Inc., Warrington, Pa., U.S.A.

In another embodiment, the positive birefringent component is PTFS, the negative birefringent component is modified by a compatibilizing block in the copolymer, selected from PAR-PMMA, PSU-PMMA, and PI-PMMA.

In another embodiment, the positive birefringent component is PTFS and the negative birefringent component is incorporated in a PI-PMMA copolymer.

In another embodiment, the positive birefringent component is PTFS, and the negative birefringent component is incorporated in a PI-PMMA copolymer, wherein the PI is 6FDA/PFMB.

In another embodiment, the positive birefringent component is PTFS, and the negative birefringent component is incorporated in a PI-PMMA copolymer, wherein the PI is 6FDA/BPDA/PFMB.

In another embodiment, the positive birefringent component is PTFS and the negative birefringent component is incorporated in a PI-PMMA copolymer, wherein the PI is 6FDA/BPDA/PFMB with a 6FDA/BPDA molar ratio of 0.5/0.5.

In another embodiment, the positive birefringent component is PTFS and the negative birefringent component incorporated in a PI-PMMA copolymer, wherein the PI is 6FDA/BPDA/PFMB with a 6FDA/BPDA molar ratio of 0.3/0.7.

In another embodiment, the compensation film further contains one or more other additives, such as anti-oxidization reagents, UV-stabilizers, plasticizers, etc.

In another embodiment, the compensation film is used in a LCD device, such as a device containing a IPS liquid crystal display. The LCD device may be used as a screen for a mobile phone, a tablet, a computer, a sign or a television.

In another embodiment, the compensation film is used in an OLED display device. The OLED display device may be used as a screen for a mobile phone, a tablet, a computer, a sign or a television.

EXAMPLES

Example 1. Synthesis of PAR-PMMA

The following is a typical procedure used to prepare PAR: In a dry 1000 mL round bottom flask equipped with magnetic stir bar, was placed BPA (18.89 g), dry chloroform (200 mL), and dry pyridine (28 mL). The BPA went into solution after several minutes of stirring. IPC (12.93 g) and TPC (12.93 g) were dissolved in 200 mL of chloroform and the solution added slowly to the PBA solution. After the addition, the funnel was washed with 50 mL of chloroform and added to the reaction solution. The reaction mixture was stirred for an additional 4 h or overnight and the reaction mixture was precipitated in 1 liter of methanol. The solid product was collected by filtration. The product was stirred in 1 liter of hot water for 30 min and then collected by filtration. It was then stirred in 200 mL of methanol for 30 min, collected by filtration, and dried at 110° C. overnight under reduced pressure. The Mn of the hydroxyl terminated oligomer was 8284 and the PDI was 1.89 as determined by GPC.

The macro initiator PAR-iBUTBr was prepared by treating the hydroxyl terminated PAR obtained above with 2-bromoisobutyrate bromide. A typical procedure follows: After 10 g of the hydroxyl terminated PAR was dissolved in 100 ml of dry chloroform contained in a 200 mL round bottom flask immersed in an ice-water bath, the solution was stirred for 0.5 hr. 2-Bromoisobutyrate bromide (1 g) and 0.35 g of diisopropylethylamine were added, and the resulting solution was stirred for over 4 hours while cooling with the ice-water bath. The reaction mixture was added to methanol and the precipitate that formed was soaked several times in methanol and dried in a vacuum oven. The Mn was 8284 and the PDI was 1.89 as determined by GPC.

An ATRP reaction was carried out in a round bottom flask equipped with a magnetic stir and sealed with a rubber septum. The reaction was carried out by mixing PAR-iButBr and MMA in toluene (20 g) followed by the addition of CuBr and PMDTA. The amounts of reaction components used are shown in Table 1. The reaction mixture was degassed under reduced pressure followed by the addition of Argon 5 times. The reaction flask was then immersed in an oil bath heated at 95° C. for 24 h. The reaction mixture was then added to 200 ml methanol containing 0.5 g of ammonium chloride and stirred for 4 h. The product that precipitated was dried at 80° C. and redissolved in chloroform. The solution was filtered through celite and added to 300 ml of methanol containing 0.5 g ammonium chloride. The product that precipitated was soaked twice in methanol to remove ammonium chloride. The molecular weight and PDI of the product are shown in Table 1. The PDI is much narrower than would be expected if double bonds were attached to the oligomer chain ends and then free radically polymerized. Thus, the use of the ATRP polymerization technique is much preferred. The amount of catalyst and ligand needed was briefly investigated with a PAR/MA ratio of ¼ g/g in 20 g of toluene. It was determined that only 32 mg CuBr was needed to carry out this polymerization. A PAR/MA ratio of ⅓ and ½ g/g was also investigated (Table 1). After the process was completed, the Br end groups can be removed to form a halogen-free product.

The amounts of reagents used to prepare the PAR-PMMA copolymers (Polymers 1-6) from different PAR/PMMA ratios are shown in Table 1.

TABLE 1

| Synthesis of PAR-PMMA | | | | | | | | |
|---|---|---|---|---|---|---|---|---|
| Polymer ID | PAR (g) | MMA (g) | CuBr (mg) | PMDTA (mg) | Product (g) | Mn | Mw | PDI |
| Polymer 1 | 1.0 | n/a | n/a | n/a | n/a | 8284 | 15616 | 1.89 |
| Polymer 2 | 1.0 | 4 | 102 | 159 | 3.36 | 27519 | 46015 | 1.68 |
| Polymer 3 | 1.0 | 4 | 58 | 84 | 4.32 | 28042 | 38084 | 1.36 |
| Polymer 4 | 1.0 | 4 | 32 | 52 | 4.38 | 30210 | 42423 | 1.61 |
| Polymer 5 | 1.0 | 4 | 82 | 140 | 4.13 | 26999 | 43021 | 1.59 |
| Polymer 6 | 1.0 | 3 | 36 | 57 | 3.68 | 23050 | 34107 | 1.48 |
| Polymer 7 | 1.0 | 2 | 38 | 56 | 2.77 | 19173 | 27070 | 1.42 |

Example 2. Synthesis of PSU-PMMA

A hydroxyl-terminated poly ether sulphone oligomer was synthesized by treating 4,4'-biphenol with DCCPS (0.91 eq.) in sulfolane in the presence of potassium carbonate. The oligomer had an Mn of 5264 as determined by GPC (Table 2). The oligomer was converted to the PSU-iButBr macro-initiator by the method used to make PAR-iButBr. However, PSU-iButBr is not soluble in toluene. The initiator could be dissolved in DMSO, DMSO/toluene and DMSO/anisole, but the amount of initiator that could be dissolved was quite low. Attempts to carry out polymerizations in these solvents and solvent mixtures resulted in quite low conversions.

The solvents 1,3-dimethoxybenzene and 1,2-dimethoxy-benzene (veratrole) provided much better results, Further study showed that a veratrole/DMSO mixture provided the best results. The polymerization procedure was similar to that used to prepare PAR-PMMA except the polymerization was carried out in 20 g of 9/1 g/g mixture of veratrole/DMSO. The polymerization details are shown in Table 2.

TABLE 2

| Synthesis of PSU-PMMA | | | | | | | | |
|---|---|---|---|---|---|---|---|---|
| Polymer ID | PSU (g) | MMA (g) | CuBr (mg) | PMDTA (mg) | Product (g) | Mn | Mw | PDI |
| Polymer 8 | 1.0 | n/a | n/a | n/a | n/a | 5264 | 10663 | 1.48 |
| Polymer 9 | 1.0 | 5 | 68 | 88 | 4.74 | 22978 | 34129 | 1.49 |
| Polymer 10 | 1.0 | 4 | 58 | 79 | 4.0 | 18659 | 27462 | 1.47 |
| Polymer 11 | 1.0 | 3 | 62 | 86 | 3.1 | 16387 | 24653 | 1.50 |
| Polymer 12 | 1.0 | 6 | 68 | 88 | 5.2 | 23328 | 36010 | 1.54 |
| Polymer 13 | 1.0 | 4 | 88 | 107 | 3.67 | 18837 | 29823 | 1.58 |

Example 3. Synthesis of PI-PMMA

An amino-terminated PI oligomer was synthesized by reacting 6FDA with PFMB (1.09 eq.) in m-cresol using thermal imidization conditions. The macroinitiator 6FDA-PFMB-iButBr was prepared by a method similar to that used to prepare PAR-iButBr. In this case, the iButBr is attached to the imide oligomer by an amide bond. The initiator is not soluble in toluene, but is soluble in anisole at room temperature.

The details of the polymerizations, which were carried out in anisole at 90° C. are shown in Table 3.

TABLE 3

Synthesis of PI-PMMA (PI: 6FDA/PFMB, 1:1.09)

| Polymer ID | PI (g) | MMA (g) | Product (g) | Mn | Mw | PDI |
|---|---|---|---|---|---|---|
| Polymer 14 | PI | n/a | n/a | 15697 | 27199 | 1.72 |
| Polymer 15 | PI-iButBr | n/a | n/a | 17172 | 28183 | 1.64 |

TABLE 3-continued

Synthesis of PI-PMMA (PI: 6FDA/PFMB, 1:1.09)

| Polymer ID | PI (g) | MMA (g) | Product (g) | Mn | Mw | PDI |
|---|---|---|---|---|---|---|
| Polymer 16 | 1.0 | 5 | 3.43 | 57113 | 105347 | 1.84 |
| Polymer 17 | 1.0 | 6 | 4.82 | 75915 | 151829 | 2.0 |
| Polymer 18 | 1.0 | 4 | 2.1 | 44376 | 75266 | 1.70 |
| Polymer 19 | 1.0 | 4 | 3.35 | 62016 | 115044 | 1.85 |
| Polymer 20 | 1.0 | 3 | 2.11 | 36294 | 60675 | 1.67 |
| Polymer 21 | 1.0 | 2 | 2.00 | 39596 | 68557 | 1.73 |

In the above polymerizations, the initial solution was clear, but after 24 h, it became cloudy. It was found that the addition of few drops of DMSO could keep the reaction solution clear. However, the DMSO slowed the polymerization and resulted in a broader PDI. Details of polymerizations containing different amounts of catalyst with or without DMSO are shown in Table 4. Less catalyst and no DMSO resulted in narrower PDIs.

TABLE 4

Synthesis of PI-PMMA (PI: 6FDA/PFMB, 1:1.09)

| Polymer ID | PI (g) | CuBr (mg) | DMSO (g) | Product (g) | Mn | Mw | PDI |
|---|---|---|---|---|---|---|---|
| Polymer 14 | PI | | n/a | n/a | 15697 | 27199 | 1.72 |
| Polymer 15 | PI-Br | | n/a | n/a | 17172 | 28183 | 1.64 |
| Polymer 22 | 1.0 | 57 | 0 | 2.99(2.96) | 47854 | 88625 | 1.85 |
| Polymer 23 | 1.0 | 32 | 0 | 2.73(2.66) | 40589 | 66445 | 1.64 |
| Polymer 24 | 1.0 | 57 | 0.3 | 3.08(2.69) | 44107 | 86272 | 1.96 |
| Polymer 25 | 1.0 | 33 | 0.3 | 2.20(2.02) | 29993 | 51027 | 1.70 |

The polymerizations detailed in Table 3, were repeated on a larger scale (4 g of initiator as opposed to 1 g) (Table 5). Again, the addition of DMSO did not improve the results.

TABLE 5

Synthesis of PI-PMMA (PI: 6FDA/PFMB, 1/1.09)

| Polymer ID | PI (g) | MMA (g) | DMSO (%) | Product (g) | Mn | Mw | PDI |
|---|---|---|---|---|---|---|---|
| Polymer 14 | PI | n/a | n/a | n/a | 15697 | 27199 | 1.72 |
| Polymer 15 | PI-Br | n/a | n/a | n/a | 17172 | 28183 | 1.64 |
| Polymer 26 | 4.0 | 12.2 | 0 | 11.8 | 55485 | 100873 | 1.82 |
| Polymer 27 | 4.0 | 12.1 | 1.5% | 9.84 | 41073 | 77025 | 1.88 |
| Polymer 28 | 4.0 | 16 | 1.5% | 12.04 | 48704 | 97406 | 2.00 |
| Polymer 29 | 4.0 | 20 | 0 | 15.1 | 61069 | 115428 | 1.89 |
| Polymer 30 | 4.0 | 20 | 1.5% | 13.92 | 55293 | 114813 | 2.08 |

The C− contribution of the PI 6FDA-PFMB to the optical properties of subsequent blends with C+ components was not as high as required to allow the preparation of very thin films. In order to increase this contribution so that thin films with the targeted properties could be prepared, the use of the PI 6FDA-BPDA-PFMB was investigated. An amino-terminated PI oligomer was synthesized by a procedure similar to that used for the PI 6FDA-PFMB oligomer. The ratio of 6FDA/BPDA was 1/1 and a 1.09 equivalent of PFMB was used (6FDA/BPDA/PFMB, 0.5/0.5/1.09). Again, the reaction was carried out in m-cresol under thermal-imidization conditions. The ATRP macroinitiator 6FDA-BPDA-PFMB-iButBr was prepared by a similar method used to make PAR-iButBr.

The details of the ATRP polymerizations of macro initiator containing the PI (6FDA/BPDA/PFMB, 0.5/0.5/1/09), which were carried out in anisole at 90° C., are shown in Table 6. The PDIs are not as narrow as those of PSU-PMMA, but they are in the same range as that of the oligomer. The molecular weights are much higher than those of PSU-PMMA.

TABLE 6

Synthesis of PI-PMMA (PI: 6FDA/BPDA/PFMB, 0.5/0.5/1.09)

| Polymer ID | PI (g) | MMA (g) | Product (g) | Mn | Mw | PDI |
|---|---|---|---|---|---|---|
| Polymer 31 | PI | n/a | n/a | 17076 | 32565 | 1.91 |
| Polymer 32 | PI-Br | n/a | n/a | 17584 | 32690 | 1.86 |
| Polymer 33 | 2.0 | 8 | 7.1 | 49446 | 84386 | 1.71 |
| Polymer 34 | 4.0 | 16.4 | 13.7 | 46838 | 88502 | 1.89 |
| Polymer 35 | 4.0 | 20 | 17.3 | 54513 | 102212 | 1.87 |

The polymerizations detailed in Table 6 were repeated on a 50 g to 100 g scale (Table 7). All of the reaction conditions other than reaction scale were the same. The results were very similar to those of the smaller scale reactions in terms of yield and molecular weight.

TABLE 7

Synthesis of PI-PMMA (PI: 6FDA/BPDA/PFMB, 0.5/0.5/1.09, 50 g scale)

| Polymer ID | PI (g) | MMA (g) | Product (g) | Mn | Mw | PDI |
|---|---|---|---|---|---|---|
| Polymer 36 | PI(0.5/0.5/1.09) | n/a | n/a | 16709 | 31436 | 1.88 |
| Polymer 37 | PI-Br | n/a | n/a | 16830 | 31464 | 1.87 |
| Polymer 38 | 4 | 16 | 13.9 | 48905 | 86795 | 1.77 |
| Polymer 39 | 4 | 18 | 15.4 | 54176 | 98210 | 1.81 |
| Polymer 40 | 14 | 70 | 61.4 | 55307 | 101554 | 1.84 |
| Polymer 41 | 14 | 63 | 51.6 | 49366 | 84272 | 1.71 |

Based on these favorable results, it was decided to increase the amount of BPDA in the PI BPDA-6FDA-PFMB. First, a BPDA-PFMB oligomer containing no 6FDA was synthesized by the same thermal imidization method in m-cresol. However, an appropriate solvent could not be found that could be used with this oligomer to prepare the ATRP macro initiator. Thus, an oligomer containing some 6FDA, i.e. BPDA-6FDA (80:20)-PFMB (1.09 eq.), was prepared in m-cresol using the thermal imidization method. However, it was difficult to find a solvent that would dissolve it at room temperature. Although it dissolved in anisole at room temperature, its solubility was low. Thus, the amount of BPDA in the oligomer was reduced. The PI BPDA-6FDA (70:30)-PFMB (1.09 eq.) was prepared in m-cresol using the thermal imidization method. The corresponding macro initiator terminated with iButBr was prepared in anisole. This PI was used in ATRP polymerizations with MMA in anisole. The Br on the chain ends could be removed to form a halogen-free product. The details of the polymerizations where there was a systematic change in the PI/MMA ratio are in Table 8.

TABLE 8 of PI-PMMA (PI: 6FDA/BPDA/PFMB, 0.3/0.7/1.09)

| Polymer ID | Synthesis PI (g) | MMA (g) | Product (g) | Mn | Mw | PDI |
|---|---|---|---|---|---|---|
| Polymer 42 | PI(0.3/0.7/1.09) | n/a | n/a | | | |
| Polymer 43 | PI-Br | n/a | n/a | | | |
| Polymer 44 | 1 | 5 | 5.1 | 62931 | 109558 | 1.74 |
| Polymer 45 | 1 | 6 | 5.3 | 63202 | 114112 | 1.81 |
| Polymer 46 | 1 | 6 | 6.0 | 73405 | 135794 | 1.85 |
| Polymer 47 | 1 | 4 | 3.8 | 51713 | 94548 | 1.83 |
| Polymer 48 | 1 | 4.5 | 4.3 | 57362 | 103766 | 1.81 |

TABLE 8-continued

| of PI-PMMA (PI: 6FDA/BPDA/PFMB, 0.3/0.7/1.09) | | | | | | |
|---|---|---|---|---|---|---|
| Polymer ID | Synthesis PI (g) | MMA (g) | Product (g) | Mn | Mw | PDI |
| Polymer 49 | 1 | 3.7 | 3.8 | 55608 | 96448 | 1.73 |
| Polymer 50 | 1 | 3.0 | 3.3 | 48591 | 84023 | 1.73 |
| Polymer 51 | 1 | 2.5 | 2.7 | 35587 | 66881 | 1.88 |

The polymerizations were then scaled up to a 50 g scale with good results (Table 9).

TABLE 9

| Synthesis of PI-PMMA (PI: 6FDA/BPDA/PFMB, 0.3/0.7/1.09, 50 g scale) | | | | | | |
|---|---|---|---|---|---|---|
| Polymer ID | PI (g) | MMA (g) | Product (g) | Mn | Mw | PDI |
| Polymer 52 | PI(0.3/0.7/1.09) | n/a | n/a | | | |
| Polymer 53 | PI-Br | n/a | n/a | | | |
| Polymer 54 | 14 | 45.1 | 48.4 | 49666 | 88793 | 1.79 |
| Polymer 55 | 14 | 56 | 54.0 | 52949 | 96428 | 1.82 |
| Polymer 56 | 20 | 56 | 62 | 45117 | 75296 | 1.67 |
| Polymer 57 | 14 | 70.4 | 70.1 | 74455 | 126459 | 1.70 |
| Polymer 58 | 14 | 57.04 | 58.2 | | | |

Up to this point, the PI macro initiators were prepared with an equivalent of 1.09 PFMB. The initiators contained approximately 11 repeating units. A PI oligomer with more repeating units (~15) was then prepared in m-cresol.

The PI (6FDA/BPDA/PFMB, 0.3/0.7/1.065) oligomer was then converted to the corresponding PI-iButBr. Two PI-PMMA copolymers based on this PI were prepared (Table 10). The two PI-PMMA copolymers had higher molecular weights than those based on 1.09 eq of PFMB with a comparable PMMA/PI ratio.

TABLE 10

| Synthesis of PI-PMMA (PI: 6FDA/BPDA/PFMB, 0.3/0.7/1.065) | | | | | | |
|---|---|---|---|---|---|---|
| Polymer ID | PI (g) | MMA (g) | Product (g) | Mn | Mw | PDI |
| Polymer 59 | PI(0.3/0.7/1.065) | n/a | n/a | | | |
| Polymer 60 | PI-Br | n/a | n/a | | | |
| Polymer 61 | 5 | 14.41 | 16.12 | 61690 | 111674 | 1.81 |
| Polymer 62 | 5 | 25.97 | 24.8 | 78263 | 134719 | 1.72 |

In similar procedure, two PIs with even more repeating units (~22) was prepared from a 6FDA/BPDA/PFMB monomer ratio of 0.3/0.7/1.045 (Table 11).

TABLE 11

| Synthesis of PI-PMMA (PI: 6FDA/BPDA/PFMB, 0.3/0.7/1.045) | | | | | | |
|---|---|---|---|---|---|---|
| Polymer ID | PI (g) | MMA (g) | Product (g) | Mn | Mw | PDI |
| Polymer 63 | PI(0.3/0.7/1.045) | n/a | n/a | | | |
| Polymer 64 | PI-Br | n/a | n/a | | | |
| Polymer 65 | 5 | 14.36 | 15.4 | 77800 | 143082 | 1.84 |
| Polymer 66 | 5 | 25.63 | 22.72 | 100881 | 195669 | 1.94 |

Example 4. Synthesis of PI-PMMA Using a One Pot PI/PI-Br Method

A one pot synthesis of PI-PMMA was devised to reduce the cost of the procedure. Thus, after PFMB was dissolved in the desired solvent (such as anisole), 6FDA was added. After the solution was stirred and heated at reflux for 1 h, BPDA was added. Stirring and heating at reflux continued overnight. The solution remained clear after cooling to room temperature. After 2-bromoisobutyryl bromide and pyridine were added and the reaction mixture was heated at reflux for 1 hour, the reaction mixture was added to methanol to precipitate the product. Using this procedure, one precipitation step could be eliminated.

ATRP polymerizations of the macro initiators prepared in this manner with MMA were carried out using several different conditions (Table 12). The Br attached to the ends of the polymers obtained could be removed. These polymerizations were scaled up using the one pot method to yield 1 kg of PI/PI-Br. These results suggest that the procedure can be used to prepare much larger quantities of product.

TABLE 12

Synthesis of PI-PMMA (PI: 6FDA/BPDA/PFMB, 0.3/0.7/1.09, one pot)

| ID | PI (g) | MMA (g) | Product (g) | Mn | Mw | PDI |
|---|---|---|---|---|---|---|
| Polymer 67 | PI-Br one pot 0.3/0.7/1.09 | n/a | n/a | | | |
| Polymer 68 | 4 | 11.25 | 12.52 | 41092 | 68180 | 1.66 |
| Polymer 69 | 2 | 5.8 | 6.2 | | | |
| Polymer 70 | 2 | 5.2 | 6.2 | 40790 | 68849 | 1.69 |
| Polymer 71 | 10 | 28 | 31.5 | 37019 | 58130 | 1.57 |
| Polymer 72 | 13.3 | 37.35 | 41.3 | 41360 | 69942 | 1.69 |

Example 5. Synthesis of PI-PS

The macro initiator PI-Br was used to prepare PI-PS, using styrene as the comonomer (Table 13)

TABLE 13

Synthesis of PI-PS (PI: 6FDA/BPDA/PFMB, 0.5/0.5/1.09)

| Polymer ID | PI (g) | St (g) | Product (g) | Mn | Mw | PDI |
|---|---|---|---|---|---|---|
| Polymer 31 | PI(0.5/0.5/1.09) | n/a | n/a | 17076 | 32565 | 1.91 |
| Polymer 32 | PI-Br | n/a | n/a | 17584 | 32690 | 1.86 |
| Polymer 73 | 2.0 | 14.0 | 5.14 | 45133 | 98391 | 2.18 |

Example 6. Polymer Film Preparation and Characterization

Some polymer or a polymer blend was dissolved in a suitable solvent, for example, cyclopentanone (CPN) at a desired concentration, such as 12 weight %. The solution was applied to a flat glass substrate using the blade casting method with a desired gap, for example, a gap of 20 mils. The film was allowed to dry in air overnight and subsequently placed in a vacuum oven at 100° C. for 8 hours. After drying, the film was peeled off and further dried as a free-standing film at 100° C. for 8 h. The birefringence of the polymer film before and after stretching was determined with a Metricon Model 2010/M Prism Coupler at the wavelength of 633 nm. The retardation of the films was measured by ellipsometry from 400 nm to 800 nm. The b* and haze of the film was measured by a HunterLab apparatus.

Example 7. Films of PAR-PMMA/PTFS Blends

PAR is not compatible with PTFS. Their blends form hazy solutions and hazy film. However, the PAR-PMMA block copolymer in blends with PTFS form clear solutions and films (Table 14).

TABLE 14

Films of PAR-PMMA/PTFS Blends

| Film ID | PAR-PMMA ID | PAR-PMMA/PTFS weight ratio | Solution in THF | Film |
|---|---|---|---|---|
| Film 1 | Polymer 2 | 80/20 | clear | Hazy |
| Film 2 | Polymer 3 | 80/20 | clear | Clear |
| Film 3 | Polymer 4 | 80/20 | clear | Slightly Hazy |

TABLE 14-continued

| Films of PAR-PMMA/PTFS Blends | | | | |
|---|---|---|---|---|
| Film ID | PAR-PMMA ID | PAR-PMMA/PTFS weight ratio | Solution in THF | Film |
| Film 4 | Polymer 6 | 80/20 | clear | Slightly Hazy |
| Film 5 | Polymer 7 | 80/20 | clear | Slightly Hazy |

Example 8. Films of PSU-PMMA

The PSU-PMMA block copolymer was initially evaluated by dissolving 25 mg in 1.0 g of THF. The clear solutions that were obtained were coated on 3" by 1" glass plates, Table 5 lists their b*, haze, transparency, Rth at 550 nm and their dispersion. As shown in the Table 15, all of them were clear and colorless.

TABLE 15

| Films of PSU-PMMA | | | | | | | |
|---|---|---|---|---|---|---|---|
| Film ID | PSU-PMMA ID | thickness um | b* | Haze % | $Rth^{550}$ | $Rth^{450}/Rth^{550}$ | $Rth^{650}/Rth^{550}$ |
| Film 6 | Polymer 9 | 10 | 0.32 | 0.75 | −20.6 | 1.157 | 0.938 |
| Film 7 | Polymer 10 | 10 | 0.26 | 0.51 | −25.9 | 1.172 | 0.923 |
| Film 8 | Polymer 11 | 10 | 0.26 | 0.45 | −38.8 | 1.165 | 0.926 |
| Film 0 | Polymer 12 | 10 | 0.24 | 0.29 | −22.3 | 1.178 | 0.921 |
| Film 10 | Polymer 13 | 10 | 0.30 | 0.38 | −32.9 | 1.171 | 0.924 |

Example 9. Films of PSU-PMMA/PTFS Blends

PSU-PMMA and PTFS were blended in a desired solvent (such as CPN and THF) to form a clear solution, which was cast into clear films. The Re and dispersion of the PSU-PMMA/PTFS films are listed in Table 16. The data shows that reversed dispersion C+ films were obtained.

TABLE 16

| Films of PSU-PMMA/PTFS Blends | | | | | | | | | |
|---|---|---|---|---|---|---|---|---|---|
| Film ID | PSU-PMMA ID | PSU-PMMA/PTFS weight ratio | d (um) | $Re^{550}$ | $Re^{450}/Re^{550}$ | $Re^{650}/Re^{550}$ | $Rth^{550}$ | $Rth^{450}/Rth^{550}$ | $Rth^{650}/Rth^{550}$ |
| Film 11 | Polymer 9 | 71/29 | 42 | 0.5 | 0.849 | 1.043 | 32.0 | 0.891 | 1.037 |
| Film 12 | Polymer 9 | 72/28 | 43 | 0.9 | 1.040 | 0.979 | 30.3 | 0.879 | 1.039 |
| Film 13 | Polymer 10 | 69/31 | 41 | 4.2 | 1.027 | 0.979 | 41.5 | 0.879 | 1.038 |
| Film 14 | Polymer 10 | 68/32 | 45 | 7.3 | 1.019 | 0.984 | 26.9 | 0.845 | 1.054 |
| Film 15 | Polymer 13 | 65/35 | 43 | 4.7 | 0.942 | 1.016 | 44.5 | 0.906 | 1.019 |
| Film 16 | Polymer 13 | 67/33 | 43 | 1.2 | 1.112 | 0.940 | 38.0 | 0.844 | 1.042 |
| Film 17 | Polymer 11 | 58/42 | 44 | 1.2 | 1.188 | 0.916 | 70.9 | 0.960 | 0.992 |

Example 10. Stretched Films of PSU-PMMA/PTFS Blends

The films of Example 9 were uniaxially stretched without constraint at a desired temperature and ratio (Tables 17-23). The stretching rate was fixed at 1%/s for all samples, if not specially noted. The films were pre-heated for 30 see to 3 min before stretching. Reversed Re was obtained for all the stretched films, with the dispersion Re450/Re550 ranging from about 0.788 to 0.986, including the ideal of 0.82.

TABLE 17

Uniaxial Unconstrained Stretching of Film 11

| Film ID | ST (C) | ratio | d (μm) | Re550 nm | Re450/ Re550 | Re650/ Re550 | Rth550 nm | Rth450/ Rth550 | Rth650/ Rth550 | Nz |
|---|---|---|---|---|---|---|---|---|---|---|
| Film 11 | | | 42 | 0.5 | 0.849 | 1.043 | 32 | 0.891 | 1.037 | |
| Film 18 | 130 | 1.25 | 36 | −59.7 | 0.867 | 1.046 | 44.4 | 0.865 | 1.043 | −0.244 |
| Film 19 | 130 | 1.5 | 31 | −80.4 | 0.868 | 1.046 | 45.5 | 0.897 | 1.032 | −0.066 |
| Film 20 | 130 | 1.75 | 28 | −92.4 | 0.898 | 1.033 | 54.3 | 0.936 | 1.013 | −0.088 |

TABLE 18

Uniaxial Unconstrained Stretching of Film 12

| Film ID | ST (C) | ratio | d (μm) | Re550 nm | Re450/ Re550 | Re650/ Re550 | Rth550 nm | Rth450/ Rth550 | Rth650/ Rth550 | Nz |
|---|---|---|---|---|---|---|---|---|---|---|
| Film 12 | | | 43 | 0.9 | 1.040 | 0.979 | 30.3 | 0.879 | 1.039 | |
| Film 21 | 130 | 1.25 | 37 | −53.3 | 0.843 | 1.056 | 35.1 | 0.866 | 1.045 | −0.159 |
| Film 22 | 130 | 1.5 | 34 | −78.1 | 0.879 | 1.041 | 48.9 | 0.888 | 1.036 | −0.126 |
| Film 23 | 130 | 1.75 | 32 | −88.3 | 0.906 | 1.03 | 50.4 | 0.941 | 1.013 | −0.071 |

TABLE 19

Uniaxial Unconstrained Stretching of Film 13

| Film ID | ST (C.) | ratio | d (μm) | Re550 nm | Re450/ Re550 | Re650/ Re550 | Rth550 nm | Rth450/ Rth550 | Rth650/ Rth550 | Nz |
|---|---|---|---|---|---|---|---|---|---|---|
| Film 13 | | | 41 | 4.2 | 1.027 | 0.979 | 41.5 | 0.879 | 1.038 | |
| Film 24 | 135 | 1.25 | 37 | −40.0 | 0.788 | 1.077 | 47.7 | 0.865 | 1.044 | −0.693 |
| Film 25 | 135 | 1.50 | 33 | −60.2 | 0.846 | 1.054 | 42.4 | 0.870 | 1.045 | −0.204 |
| Film 26 | 135 | 1.375 | 35 | −72.3 | 0.881 | 1.041 | 52.1 | 0.916 | 1.023 | −0.221 |
| Film 27 | 135 | 1.75 | 30 | −83.7 | 0.903 | 1.032 | 56.6 | 0.918 | 1.023 | −0.176 |

TABLE 20

Uniaxial Unconstrained Stretching of Film 14

| Film ID | ST (C.) | ratio | d (μm) | Re550 nm | Re450/ Re550 | Re650/ Re550 | Rth550 nm | Rth450/ Rth550 | Rth650/ Rth550 | Nz |
|---|---|---|---|---|---|---|---|---|---|---|
| Film 14 | | | 45 | 7.3 | 1.019 | 0.984 | 26.9 | 0.845 | 1.054 | |
| Film 28 | 135 | 1.25 | 37 | −50.6 | 0.821 | 1.064 | 50 | 0.869 | 1.043 | −0.488 |
| Film 29 | 135 | 1.5 | 34 | −74.6 | 0.881 | 1.041 | 55.3 | 0.912 | 1.022 | −0.241 |
| Film 30 | 135 | 1.75 | 33 | −102.4 | 0.917 | 1.025 | 64.9 | 0.969 | 0.985 | −0.134 |
| Film 31 | 137 | 1.5 | 35 | −85.3 | 0.915 | 1.027 | 58.6 | 0.940 | 1.015 | −0.187 |
| Film 32 | 140 | 1.5 | 34 | −77.9 | 0.926 | 1.022 | 59.7 | 0.947 | 1.012 | −0.266 |

TABLE 21

| Uniaxial Unconstrained Stretching of Film 15 | | | | | | | | | | |
|---|---|---|---|---|---|---|---|---|---|---|
| Film ID | ST (C.) | ratio | d (μm) | Re550 nm | Re450/ Re550 | Re650/ Re550 | Rth550 nm | Rth450/ Rth550 | Rth650/ Rth550 | Nz |
| Film 15 | | | 43 | 4.7 | 0.942 | 1.016 | 44.5 | 0.906 | 1.019 | |
| Film 33 | 145 | 1.25 | 38 | −63.9 | 0.880 | 1.041 | 55.2 | 0.974 | 0.987 | −0.364 |
| Film 34 | 145 | 1.5 | 34 | −99.2 | 0.934 | 1.019 | 77.4 | 1.053 | 0.943 | −0.28 |
| Film 35 | 145 | 1.75 | 29 | −107.1 | 0.952 | 1.012 | 56.5 | 1.024 | 0.964 | −0.028 |

TABLE 22

| Uniaxial Unconstrained Stretching of Film 16 | | | | | | | | | | |
|---|---|---|---|---|---|---|---|---|---|---|
| Film ID | ST (C.) | ratio | d (μm) | Re550 nm | Re450/ Re550 | Re650/ Re550 | Rth550 nm | Rth450/ Rth550 | Rth650/ Rth550 | Nz |
| Film 16 | | | 43 | 1.2 | 1.112 | 0.940 | 38.0 | 0.844 | 1.042 | |
| Film 36 | 145 | 1.25 | 38 | −50.2 | 0.861 | 1.047 | 43.0 | 0.893 | 1.021 | −0.357 |
| Film 37 | 145 | 1.5 | 35 | −84.8 | 0.903 | 1.032 | 58.9 | 0.888 | 1.030 | −0.195 |
| Film 38 | 145 | 1.75 | 32 | −92.6 | 0.936 | 1.019 | 60.1 | 0.997 | 0.977 | −0.149 |

TABLE 23

| Uniaxial Unconstrained Stretching of Film 17 | | | | | | | | | | |
|---|---|---|---|---|---|---|---|---|---|---|
| Film ID | ST (C.) | ratio | d (μm) | Re550 nm | Re450/ Re550 | Re650/ Re550 | Rth550 nm | Rth450/ Rth550 | Rth650/ Rth550 | Nz |
| Film 17 | | | 44 | 1.2 | 1.188 | 0.916 | 70.9 | 0.96 | 0.992 | |
| Film 39 | 145 | 1.25 | 37 | −96.6 | 0.912 | 1.028 | 102.8 | 1.027 | 0.965 | −0.564 |
| Film 40 | 145 | 1.5 | 34 | −158.6 | 0.965 | 1.007 | 111.6 | 1.062 | 0.947 | −0.204 |
| Film 41 | 145 | 1.75 | 33 | −187.2 | 0.986 | 0.998 | 112.3 | 1.077 | 0.95 | −0.1 |

Example 11. Films of PI-PMMA

Samples (25 mg) of the PI-PMMA block copolymers were dissolved in 1.0 g of CPN yielding clear solutions that were cast into clear and colorless films.

Example 12. Films of PI-PMMA/PTFS Blends

PI-PMMA and PTFS were blended in a desired solvent (such as CPN) to form clear solutions and then cast into clear films. The optical properties of some of the PI-PMMA/PTFS films are listed in Table 24. Reversed dispersion C+ films were obtained, with Rth450/Rth550 dispersions ranging from −0.77 to 0.97, including the ideal dispersion 0.82.

TABLE 24

| Films of PI-PMMA/PTFS Blends | | | | | | | | | |
|---|---|---|---|---|---|---|---|---|---|
| Film ID | PI-PMMA ID | PI-PMMA/PTFS weight ratio | d (um) | $Re^{550}$ | $Re^{450}/Re^{550}$ | $Re^{650}/Re^{550}$ | $Rth^{550}$ | $Rth^{450}/Rth^{550}$ | $Rth^{650}/Rth^{550}$ |
| Film 42 | Polymer 26 | 60.8/39.2 | 41 | 2.6 | 1.105 | 0.986 | 53.1 | 0.879 | 1.033 |
| Film 43 | Polymer 26 | 60/40 | 38 | 2.6 | 0.336 | 1.305 | 64.6 | 0.904 | 1.021 |
| Film 44 | Polymer 29 | 66/34 | 44 | 0.3 | 1.185 | 0.910 | 47.6 | 0.882 | 1.036 |
| Film 45 | Polymer 33 | 45.5/54.5 | 40 | 0.3 | 1.329 | 0.810 | 102.4 | 0.891 | 1.015 |
| Film 46 | Polymer 33 | 46.3/53.7 | 41 | 0.4 | 0.813 | 1.022 | 90.4 | 0.825 | 1.029 |
| Film 47 | Polymer 33 | 47.0/53.0 | 41 | 2.2 | 0.728 | 1.099 | 76.2 | 0.794 | 1.051 |
| Film 48 | Polymer 33 | 48.1/51.9 | 37 | 0.1 | 1.829 | 0.687 | 75.8 | 0.779 | 1.042 |
| Film 49 | Polymer 33 | 50.2/49.8 | 36 | 0.1 | 0.377 | 1.380 | 34.9 | 0.452 | 1.156 |
| Film 50 | Polymer 40 | 50.8/49.2 | 37 | 0.1 | 0.734 | 1.020 | 104.0 | 0.923 | 1.001 |
| Film 51 | Polymer 40 | 52.8/47.2 | 36 | 2.9 | 0.952 | 1.008 | 79.3 | 0.876 | 1.026 |

TABLE 24-continued

Films of PI-PMMA/PTFS Blends

| Film ID | PI-PMMA ID | PI-PMMA/PTFS weight ratio | d (um) | $Re^{550}$ | $Re^{450}/Re^{550}$ | $Re^{650}/Re^{550}$ | $Rth^{550}$ | $Rth^{450}/Rth^{550}$ | $Rth^{650}/Rth^{550}$ |
|---|---|---|---|---|---|---|---|---|---|
| Film 52 | Polymer 41 | 48.1/51.9 | 46 | 0.4 | 0.953 | 0.922 | 90.3 | 0.864 | 1.020 |
| Film 53 | Polymer 41 | 50.2/49.8 | 49 | 0.2 | 1.574 | 0.744 | 72.3 | 0.785 | 1.035 |
| Film 54 | Polymer 44 | 44.5/55.5 | 38 | 0.1 | 0.716 | 1.098 | 129.6 | 0.908 | 1.014 |
| Film 55 | Polymer 48 | 51.5/48.5 | 38 | 0.2 | 0.786 | 1.180 | 106.6 | 0.884 | 1.028 |
| Film 56 | Polymer 44 | 51.5/48.5 | 38 | 0.4 | 0.918 | 1.020 | 95.2 | 0.899 | 1.028 |
| Film 57 | Polymer 45 | 53.0/47.0 | 36 | 0.3 | 0.999 | 0.957 | 84.8 | 0.901 | 1.026 |
| Film 58 | Polymer 46 | 53.0/47.0 | 37 | 0.3 | 0.877 | 1.009 | 87.9 | 0.891 | 1.032 |
| Film 59 | Polymer 54 | 48.0/52.0 | 45 | 0.4 | 1.193 | 0.902 | 147.7 | 0.913 | 1.022 |
| Film 60 | Polymer 54 | 52.0/48.0 | 30 | 0.5 | 1.207 | 0.903 | 70.1 | 0.818 | 1.060 |
| Film 61 | Polymer 54 | 56.0/44.0 | 34 | 0.5 | 1.259 | 0.893 | 56.3 | 0.707 | 1.101 |
| Film 62 | Polymer 55 | 50.0/50.0 | 37 | 0.4 | 1.178 | 0.907 | 149.8 | 0.958 | 1.004 |
| Film 63 | Polymer 54 | 49.0/51.0 | 30 | 0.5 | 1.156 | 0.907 | 100.9 | 0.875 | 1.035 |
| Film 64 | Polymer 54 | 50.0/50.0 | 34 | 0.4 | 1.303 | 0.867 | 100.0 | 0.868 | 1.034 |
| Film 65 | Polymer 54 | 58.0/42.0 | 44 | 0.7 | 0.847 | 1.025 | 54.0 | 0.528 | 1.162 |
| Film 66 | Polymer 54 | 50.0/50.0 | 32 | 0.4 | 1.200 | 0.880 | 118.7 | 0.933 | 1.015 |
| Film 67 | Polymer 56 | 50.0/50.0 | 34 | 0.7 | 1.093 | 0.946 | 104.4 | 0.886 | 1.032 |
| Film 68 | Polymer 56 | 47.0/53.0 | 40 | 0.5 | 1.226 | 0.878 | 173.2 | 0.974 | 0.992 |
| Film 69 | Polymer 54 | 58.0/42.0 | 37 | 0.5 | 1.259 | 0.837 | 170.7 | 0.762 | 1.079 |
| Film 70 | Polymer 57 | 66.6/33.4 | 34 | 0.4 | 1.385 | 0.849 | 10.1 | −0.770 | 1.640 |
| Film 71 | Polymer 57 | 63.3/36.7 | 33 | 0.4 | 1.354 | 0.860 | 29.1 | 0.441 | 1.202 |
| Film 72 | Polymer 56 | 58.0/42.0 | 41 | 0.1 | 0.390 | 1.158 | 56.9 | 0.597 | 1.116 |
| Film 73 | Polymer 56 | 58.0/42.0 | 59 | 0.6 | 1.226 | 0.890 | 121.6 | 0.832 | 1.048 |
| Film 74 | Polymer 56 | 58.0/42.0 | 68 | 0.7 | 1.097 | 0.946 | 107.8 | 0.858 | 1.039 |
| Film 75 | Polymer 56 | 57.0/43.0 | 68 | 0.6 | 1.205 | 0.859 | 127.6 | 0.915 | 1.022 |
| Film 76 | Polymer 56 | 59.0/41.0 | 71 | 0.7 | 1.222 | 0.901 | 125.7 | 0.874 | 1.036 |
| Film 77 | Polymer 58 | 61.9/38.1 | 36 | 0.5 | 1.250 | 0.881 | 70.9 | 0.816 | 1.055 |
| Film 78 | Polymer 58 | 58.8/41.2 | 42 | 0.6 | 1.045 | 0.973 | 111.4 | 0.881 | 1.036 |

Example 13 Stretched Films of PI-PMMA/PTFS Blends

The films of Example 12 were stretched uniaxially without constraint, uniaxial with constraint and biaxially, at desired temperatures and stretch ratios. (Tables 25-61). The stretching rate was fixed at 1%/s for all samples, if not specially noted. The samples were pre-heated for 30 see to 3 min. For uniaxial stretching without constraint, one number is used to specify the stretching direction ratio L/L.0. For uniaxial with constraint, two numbers in the format of (first number)×(second number). The first number is the ratio along the stretching direction, and the second number is 1, indicating constraint in the TD direction. For biaxial stretching, the ratio term has two numbers in the format of (first number)×(second number), the first number is the ratio along one stretching direction, and the second number is the ratio along the other direction.

The as cast films and stretched films all have low color and low haze (b* and haze) as shown in Table 42 (Film 59 and the stretched films). The haze and b* of other similar films has similar results and are not listed.

Different types of uncommon compensation films have been obtained from the PI-PMMA/PTFS blend, including RD C+ films, RD A−/B+ films, flat Z-films and RD Z-films.

TABLE 25

Uniaxial Unconstrained Stretching of Film 42

| Film ID | ST (C.) | ratio | d (μm) | Re550 nm | Re450/ Re550 | Re650/ Re550 | Rth550 nm | Rth450/ Rth550 | Rth650/ Rth550 | Nz |
|---|---|---|---|---|---|---|---|---|---|---|
| Film 42 | | | 41 | 2.6 | 1.015 | 0.986 | 53.1 | 0.879 | 1.033 | |
| Film 79 | 154 | 1.25 | 32 | −57.4 | 0.712 | 1.114 | 86.8 | 0.996 | 0.957 | −1.011 |
| Film 80 | 155 | 1.25 | 32 | −72.5 | 0.759 | 1.092 | 2.6 | 0.110 | 1.843 | 0.465 |
| Film 81 | 160 | 1.25 | 32 | −69.6 | 0.841 | 1.060 | 76.4 | 1.001 | 0.961 | −0.598 |
| Film 82 | 155 | 1.5 | 29 | −74.2 | 0.748 | 1.099 | 60.9 | 0.965 | 0.938 | −0.320 |
| Film 83 | 155 | 1.5 | 29 | −72.4 | 0.743 | 1.102 | 63.8 | 0.974 | 0.931 | −0.382 |
| Film 84 | 157 | 1.5 | 29 | −77.0 | 0.763 | 1.092 | 70.4 | 1.039 | 0.917 | −0.414 |
| Film 85 | 160 | 1.5 | 29 | −92.5 | 0.833 | 1.063 | 65.6 | 1.033 | 0.933 | −0.210 |
| Film 86 | 155 | 1.75 | 27 | −92.4 | 0.803 | 1.075 | 48.3 | 0.952 | 0.939 | −0.023 |
| Film 87 | 157 | 1.75 | 27 | −89.1 | 0.805 | 1.074 | 54.5 | 0.935 | 0.979 | −0.112 |
| Film 88 | 160 | 1.75 | 27 | −99.6 | 0.833 | 1.061 | 59.2 | 0.992 | 0.988 | −0.094 |
| Film 89 | 162 | 1.75 | 27 | −108.1 | 0.862 | 1.051 | 72.4 | 1.064 | 0.936 | −0.170 |

TABLE 26

| Uniaxial Unconstrained Stretching of Film 43 | | | | | | | | | | |
|---|---|---|---|---|---|---|---|---|---|---|
| Film ID | ST (C.) | ratio | d (μm) | Re550 nm | Re450/ Re550 | Re650/ Re550 | Rth550 nm | Rth450/ Rth550 | Rth650/ Rth550 | Nz |
| Film 43 | | | 38 | 2.6 | 0.336 | 1.305 | 64.6 | 0.904 | 1.021 | |
| Film 90 | 156 | 1.25 | 32 | −85.9 | 0.899 | 1.036 | 75.7 | 1.056 | 0.944 | −0.382 |
| Film 91 | 160 | 1.25 | 32 | −86.6 | 0.903 | 1.034 | 80.9 | 1.082 | 0.932 | −0.434 |
| Film 92 | 162 | 1.25 | 32 | −80.4 | 0.906 | 1.033 | 78.2 | 1.084 | 0.933 | −0.473 |
| Film 93 | 156 | 1.5 | 29 | −104.0 | 0.878 | 1.044 | 86.2 | 1.111 | 0.907 | −0.329 |
| Film 94 | 161 | 1.5 | 29 | −117.0 | 0.901 | 1.035 | 84.0 | 1.139 | 0.903 | −0.218 |
| Film 95 | 163 | 1.5 | 29 | −109.7 | 0.910 | 1.031 | 99.4 | 1.113 | 0.915 | −0.406 |
| Film 96 | 160 | 1.5 | 29 | −119.2 | 0.884 | 1.042 | 94.8 | 1.141 | 0.895 | −0.295 |
| Film 97 | 161 | 1.75 | 27 | −123.7 | 0.905 | 1.033 | 84.6 | 1.131 | 0.920 | −0.184 |
| Film 98 | 163 | 1.75 | 27 | −123.0 | 0.915 | 1.029 | 93.6 | 1.147 | 0.898 | −0.261 |

TABLE 27

| Uniaxial Unconstrained Stretching of Film 44 | | | | | | | | | | |
|---|---|---|---|---|---|---|---|---|---|---|
| Film ID | ST (C.) | ratio | d (μm) | Re550 nm | Re450/ Re550 | Re650/ Re550 | Rth550 nm | Rth450/ Rth550 | Rth650/ Rth550 | Nz |
| Film 44 | | | 44 | 0.3 | 1.185 | 0.910 | 47.6 | 0.882 | 1.036 | |
| Film 99 | 155 | 1.25 | 34 | −45.4 | 0.678 | 1.129 | 39.1 | 0.837 | 1.024 | −0.361 |
| Film 100 | 155 | 1.5 | 30 | −59.1 | 0.714 | 1.114 | 46.4 | 0.882 | 0.994 | −0.285 |
| Film 101 | 161 | 1.5 | 31 | −67.0 | 0.779 | 1.087 | 63.3 | 0.908 | 0.992 | −0.445 |
| Film 102 | 159 | 1.5 | 30 | −65.5 | 0.763 | 1.094 | 57.1 | 0.885 | 0.993 | −0.371 |
| Film 103 | 164 | 1.5 | 33 | −66.8 | 0.804 | 1.076 | 49.1 | 0.942 | 0.983 | −0.234 |
| Film 104 | 155 | 1.5 | 31 | −67.1 | 0.723 | 1.111 | 33.5 | 0.771 | 1.028 | −0.001 |
| Film 105 | 161 | 1.5 | 30 | −72.6 | 0.795 | 1.080 | 55.6 | 0.925 | 0.977 | −0.266 |
| Film 106 | 158 | 1.75 | 29 | −75.4 | 0.782 | 1.085 | 47.1 | 0.931 | 0.981 | −0.125 |
| Film 107 | 153 | 1.75 | 27 | −83.9 | 0.731 | 1.065 | 51.2 | 0.991 | 0.969 | −0.109 |

TABLE 28

| Uniaxial Unconstrained Stretching of Film 45 | | | | | | | | | | |
|---|---|---|---|---|---|---|---|---|---|---|
| Film ID | ST (C.) | ratio | d (μm) | Re550 nm | Re450/ Re550 | Re650/ Re550 | Rth550 nm | Rth450/ Rth550 | Rth650/ Rth550 | Nz |
| Film 45 | | | 40 | 0.3 | 1.329 | 0.810 | 102.4 | 0.891 | 1.015 | |
| Film 108 | 162 | 1.25 | 30 | −210.1 | 0.936 | 1.017 | 155.4 | 1.114 | 0.882 | −0.240 |
| Film 109 | 165 | 1.25 | 29 | −213.3 | 0.944 | 1.014 | 198.1 | 1.120 | 0.882 | −0.429 |
| Film 110 | 168 | 1.25 | 32 | −207.7 | 0.959 | 1.008 | 133.4 | 1.068 | 0.914 | −0.142 |
| Film 111 | 162 | 1.5 | 28 | −243.3 | 0.930 | 1.019 | 191.7 | 1.191 | 0.853 | −0.288 |
| Film 112 | 165 | 1.5 | 27 | −246.9 | 0.937 | 1.016 | 176.4 | 1.167 | 0.871 | −0.215 |
| Film 113 | 168 | 1.5 | 27 | −251.5 | 0.942 | 1.015 | 212.1 | 1.199 | 0.852 | −0.343 |
| Film 114 | 165 | 1.5 | 29 | −261.5 | 0.952 | 1.011 | 187.5 | 1.180 | 0.869 | −0.217 |
| Film 115 | 162 | 1.75 | 28 | −283.1 | 0.938 | 1.015 | 171.4 | 1.215 | 0.840 | −0.105 |
| Film 116 | 166 | 1.75 | 25 | −266.3 | 0.944 | 1.014 | 185.5 | 1.170 | 0.880 | −0.197 |
| Film 117 | 168 | 1.75 | 26 | −272.3 | 0.947 | 1.012 | 173.3 | 1.118 | 0.916 | −0.137 |

Note:
Film 114 was stretched at a rate of 0.5%/s.

TABLE 29

| Uniaxial Unconstrained Stretching of Film 46 | | | | | | | | | | |
|---|---|---|---|---|---|---|---|---|---|---|
| Film ID | ST (C.) | ratio | d (μm) | Re550 nm | Re450/ Re550 | Re650/ Re550 | Rth550 nm | Rth450/ Rth550 | Rth650/ Rth550 | Nz |
| Film 46 | | | 41 | 0.4 | 0.813 | 1.022 | 90.4 | 0.825 | 1.029 | |
| Film 118 | 167 | 1.25 | 36 | −175.6 | 0.930 | 1.019 | 124.6 | 1.052 | 0.907 | −0.210 |
| Film 119 | 165 | 1.25 | 34 | −188.1 | 0.945 | 1.013 | 115.8 | 1.006 | 0.931 | −0.116 |

TABLE 29-continued

| Uniaxial Unconstrained Stretching of Film 46 | | | | | | | | | | | |
|---|---|---|---|---|---|---|---|---|---|---|---|
| Film ID | ST (C.) | ratio | d (μm) | Re550 nm | Re450/ Re550 | Re650/ Re550 | Rth550 nm | Rth450/ Rth550 | Rth650/ Rth550 | Nz |
| Film 120 | 167 | 1.25 | 33 | −226.8 | 0.928 | 1.016 | 176.8 | 1.192 | 0.849 | −0.316 |
| Film 121 | 167 | 1.5 | 32 | −191.5 | 0.911 | 1.026 | 129.7 | 1.051 | 0.925 | −0.177 |
| Film 122 | 165 | 1.5 | 32 | −207.9 | 0.920 | 1.022 | 219.5 | 1.220 | 0.824 | −0.556 |
| Film 123 | 169 | 1.5 | 30 | −191.6 | 0.913 | 1.025 | 142.9 | 1.122 | 0.872 | −0.246 |
| Film 124 | 167 | 1.5 | 31 | −230.2 | 0.915 | 1.025 | 151.6 | 1.199 | 0.832 | −0.159 |
| Film 125 | 167 | 1.75 | 30 | −242.8 | 0.926 | 1.020 | 185.1 | 1.167 | 0.876 | −0.262 |
| Film 126 | 165 | 1.75 | 30 | −226.6 | 0.919 | 1.023 | 150.9 | 1.201 | 0.833 | −0.138 |
| Film 127 | 170 | 1.75 | 32 | −225.7 | 0.904 | 1.028 | 178.6 | 1.145 | 0.878 | −0.291 |

Note:
Films 121 and 125 were stretched at a rate of 0.5%/s.

TABLE 30

| Uniaxial Unconstrained Stretching of Film 47 | | | | | | | | | | |
|---|---|---|---|---|---|---|---|---|---|---|
| Film ID | ST (C.) | ratio | d (μm) | Re550 nm | Re450/ Re550 | Re650/ Re550 | Rth550 nm | Rth450/ Rth550 | Rth650/ Rth550 | Nz |
| Film 47 | | | 41 | 2.2 | 0.728 | 1.099 | 76.2 | 0.794 | 1.051 | |
| Film 128 | 167 | 1.25 | 39 | −183.8 | 0.932 | 1.018 | 110.5 | 0.961 | 0.946 | −0.101 |
| Film 129 | 169 | 1.25 | 34 | −167.7 | 0.939 | 1.015 | 101.9 | 0.906 | 0.991 | −0.107 |
| Film 130 | 166 | 1.5 | 33 | −206.0 | 0.921 | 1.022 | 130.2 | 1.034 | 0.925 | −0.132 |
| Film 131 | 169 | 1.5 | 31 | −214.3 | 0.924 | 1.021 | 135.0 | 1.046 | 0.924 | −0.130 |
| Film 132 | 169 | 1.5 | 30 | −215.8 | 0.932 | 1.019 | 134.4 | 1.046 | 0.926 | −0.123 |
| Film 133 | 171 | 1.5 | 31 | −212.8 | 0.930 | 1.019 | 130.9 | 1.036 | 0.932 | −0.115 |
| Film 134 | 165 | 1.5 | 30 | −225.5 | 0.924 | 1.022 | 133.9 | 1.070 | 0.893 | −0.094 |
| Film 135 | 176 | 1.5 | 30 | −193.0 | 0.908 | 1.027 | 115.0 | 0.962 | 0.954 | −0.096 |
| Film 136 | 174 | 1.5 | 31 | −202.0 | 0.923 | 1.022 | 111.7 | 1.041 | 0.917 | −0.053 |
| Film 137 | 166 | 1.75 | 28 | −238.6 | 0.926 | 1.021 | 156.6 | 1.067 | 0.929 | −0.156 |
| Film 138 | 169 | 1.75 | 28 | −242.1 | 0.926 | 1.021 | 135.1 | 1.118 | 0.880 | −0.058 |

Note:
Films 132, 133 and 134 were stretched at a rate of 0.5%/s.

TABLE 31

| Uniaxial Unconstrained Stretching of Film 48 | | | | | | | | | | |
|---|---|---|---|---|---|---|---|---|---|---|
| Film ID | ST (C.) | ratio | d (μm) | Re550 nm | Re450/ Re550 | Re650/ Re550 | Rth550 nm | Rth450/ Rth550 | Rth650/ Rth550 | Nz |
| Film 48 | | | 37 | 0.1 | 1.829 | 0.687 | 75.8 | 0.779 | 1.042 | |
| Film 139 | 157 | 1.25 | 31 | −154.1 | 0.893 | 1.035 | 112.9 | 0.880 | 0.952 | −0.232 |
| Film 140 | 164 | 1.25 | 33 | −165.5 | 0.926 | 1.021 | 105.2 | 0.987 | 0.932 | −0.136 |
| Film 141 | 167 | 1.25 | 32 | −163.1 | 0.926 | 1.021 | 105.1 | 0.970 | 0.937 | −0.144 |
| Film 142 | 158 | 1.5 | 32 | −192.7 | 0.896 | 1.033 | 101.6 | 1.003 | 0.895 | −0.027 |
| Film 143 | 158 | 1.5 | 35 | −215.4 | 0.908 | 1.027 | 143.3 | 1.036 | 0.911 | −0.165 |
| Film 144 | 164 | 1.5 | 30 | −181.6 | 0.919 | 1.023 | 112.2 | 0.999 | 0.936 | −0.118 |
| Film 145 | 167 | 1.5 | 31 | −187.6 | 0.912 | 1.026 | 134.9 | 1.066 | 0.893 | −0.219 |
| Film 146 | 162 | 1.5 | 31 | −186.0 | 0.923 | 1.021 | 116.2 | 0.997 | 0.932 | −0.125 |
| Film 147 | 158 | 1.75 | 26 | −171.4 | 0.882 | 1.038 | 102.7 | 0.974 | 0.905 | −0.100 |
| Film 148 | 154 | 1.75 | 30 | −195.5 | 0.914 | 1.025 | 134.0 | 1.074 | 0.897 | −0.185 |

Note:
Films 143, 144, 145, 146 and 148 were stretched at a rate of 0.5%/s.

TABLE 32

| Uniaxial Unconstrained Stretching of Film 49 | | | | | | | | | | |
|---|---|---|---|---|---|---|---|---|---|---|
| Film ID | ST (C.) | ratio | d (μm) | Re550 nm | Re450/ Re550 | Re650/ Re550 | Rth550 nm | Rth450/ Rth550 | Rth650/ Rth550 | Nz |
| Film 49 | | | 36 | 0.1 | 0.377 | 1.380 | 34.9 | 0.452 | 1.156 | |
| Film 149 | 162 | 1.25 | 29 | −136.6 | 0.855 | 1.049 | 119.7 | 0.987 | 0.918 | −0.377 |
| Film 150 | 160 | 1.25 | 29 | −135.4 | 0.853 | 1.050 | 89.6 | 0.876 | 0.957 | −0.162 |
| Film 151 | 157 | 1.25 | 29 | −122.1 | 0.813 | 1.065 | 94.7 | 0.869 | 0.946 | −0.276 |
| Film 152 | 162 | 1.375 | 27 | −136.4 | 0.830 | 1.057 | 81.2 | 0.842 | 0.944 | −0.095 |
| Film 153 | 162 | 1.375 | 28 | −155.1 | 0.865 | 1.044 | 85.3 | 0.838 | 0.946 | −0.050 |
| Film 154 | 162 | 1.5 | 27 | −162.6 | 0.861 | 1.045 | 84.5 | 0.891 | 0.915 | −0.020 |

Note:

Films 153 and 154 were stretched at a rate of 0.5%/s.

TABLE 33

| Uniaxial Constrained and Biaxial Stretching of Film 50 | | | | | | | | | | |
|---|---|---|---|---|---|---|---|---|---|---|
| Film ID | ST (C.) | ratio | d (μm) | Re550 nm | Re450/ Re550 | Re650/ Re550 | Rth550 nm | Rth450/ Rth550 | Rth650/ Rth550 | Nz |
| Film 50 | | | 37 | 0.10 | 0.734 | 1.020 | 104.0 | 0.923 | 1.001 | |
| Film155 | 150 | 1.2 × 1.0 | 31 | −48.34 | 0.955 | 1.010 | 71.25 | 0.918 | 0.998 | 0.974 |
| Film156 | 150 | 1.4 × 1.0 | 28 | −73.27 | 0.948 | 1.014 | 86.01 | 0.954 | 0.978 | −0.674 |
| Film157 | 150 | 1.6 × 1.0 | 24 | −86.01 | 0.944 | 1.014 | 84.76 | 0.947 | 0.983 | −0.485 |
| Film158 | 150 | 1.3 × 1.3 | 23 | −3.796 | 0.931 | 1.023 | 77.82 | 0.886 | 1.025 | −20 |
| Film159 | 155 | 1.4 × 1.0 | 29 | −60.6 | 0.939 | 1.015 | 72.33 | 0.904 | 1.004 | −0.694 |
| Film160 | 155 | 1.3 × 1.3 | 24 | −4.315 | 0.965 | 1.004 | 70.29 | 0.856 | 1.039 | −15.79 |
| Film161 | 155 | 1.6 × 1.0 | 24 | −74.48 | 0.935 | 1.018 | 76.17 | 0.936 | 0.984 | −0.523 |
| Film162 | 160 | 1.6 × 1.0 | 25 | −66.36 | 0.923 | 1.021 | 69.49 | 0.918 | 0.998 | −0.547 |

TABLE 34

| Uniaxial Constrained and Biaxial Stretching of Film 51 | | | | | | | | | | |
|---|---|---|---|---|---|---|---|---|---|---|
| Film ID | ST ° C. | ratio | d (μm) | Re550 nm | Re450/ Re550 | Re650/ Re550 | Rth550 | Rth450/ Rth550 | Rth650/ Rth550 | Nz |
| Film 51 | | | 36 | −2.9 | 0.952 | 1.008 | 79.3 | 0.876 | 1.026 | |
| Film 163 | 150 | 1.2 × 1.0 | 34 | −40.37 | 0.926 | 1.02 | 56.39 | 0.812 | 1.036 | −0.897 |
| Film 164 | 150 | 1.4 × 1.0 | 32 | −58.14 | 0.914 | 1.024 | 65.99 | 0.844 | 1.024 | −0.635 |
| Film 165 | 150 | 1.6 × 1.0 | 28 | −73.42 | 0.909 | 1.028 | 70.83 | 0.856 | 0.996 | −0.465 |
| Film 166 | 150 | 1.3 × 1.3 | 25 | −3.189 | 0.894 | 1.04 | 65.4 | 0.81 | 1.052 | −20.01 |

TABLE 35

| Uniaxial Constrained and Biaxial Stretching of Film 52 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 | Rth450/ Rth550 | Rth650/ Rth550 | Nz |
| Film 52 | | | 46 | −0.4 | 0.953 | 0.922 | 90.32 | 0.864 | 1.020 | |
| Film 167 | 150 | 1.2 × 1.0 | 31 | −57.5 | 0.959 | 1.008 | 79.8 | 0.905 | 0.993 | −0.887 |
| Film 168 | 150 | 1.4 × 1.0 | 28 | −85.5 | 0.953 | 1.011 | 102.3 | 0.957 | 0.958 | −0.696 |
| Film 169 | 150 | 1.6 × 1.0 | 27 | −108.0 | 0.949 | 1.013 | 113.4 | 0.991 | 0.945 | −0.55 |
| Film 170 | 150 | 1.3 × 1.3 | 25 | −3.6 | 0.950 | 1.017 | 87.54 | 0.879 | 1.017 | −23.51 |

TABLE 36

Uniaxial Constrained and Biaxial Stretching of Film 53

| Film ID | ST (° C.) | ratio | d (μm) | Re550 nm | Re450/ Re550 | Re650/ Re550 | Rth550 | Rth450/ Rth550 | Rth650/ Rth550 | Nz |
|---|---|---|---|---|---|---|---|---|---|---|
| Film 53 | | | 49 | −0.2 | 1.574 | 0.744 | 72.3 | 0.785 | 1.035 | |
| Film 171 | 150 | 1.2 × 1.0 | 36 | −49.9 | 0.941 | 1.015 | 61.4 | 0.811 | 1.023 | −0.73 |
| Film 172 | 150 | 1.4 × 1.0 | 28 | −70.1 | 0.936 | 1.018 | 72.9 | 0.872 | 0.997 | −0.54 |
| Film 173 | 150 | 1.6 × 1.0 | 26 | −83.9 | 0.930 | 1.020 | 78.5 | 0.904 | 0.984 | −0.436 |
| Film 174 | 150 | 1.3 × 1.3 | 24 | −4.6 | 0.904 | 1.032 | 64.3 | 0.81 | 1.044 | −13.39 |

TABLE 37

Uniaxial Unconstrained Stretching of Film 54

| Film ID | ST (° C.) | ratio | d (μm) | Re550 nm | Re450/ Re550 | Re650/ Re550 | Rth550 | Rth450/ Rth550 | Rth650/ Rth550 | Nz |
|---|---|---|---|---|---|---|---|---|---|---|
| Film 54 | | | 38 | 0.1 | 0.716 | 1.098 | 129.6 | 0.908 | 1.014 | |
| Film 175 | 158 | 1.25 | 30 | −268.5 | 0.976 | 1.002 | 169.8 | 0.996 | 0.968 | −0.132 |
| Film 176 | 156 | 1.375 | 28 | −276.5 | 0.964 | 1.007 | 163.1 | 1.011 | 0.958 | −0.090 |
| Film 177 | 157 | 1.5 | 28 | −297.0 | 0.969 | 1.005 | 189.8 | 1.052 | 0.947 | −0.139 |

TABLE 38

Uniaxial Unconstrained Stretching of Film 55

| Film ID | ST (° C.) | ratio | d (μm) | Re550 nm | Re450/ Re550 | Re650/ Re550 | Rth550 | Rth450/ Rth550 | Rth650/ Rth550 | Nz |
|---|---|---|---|---|---|---|---|---|---|---|
| Film 55 | | | 38 | 0.2 | 0.786 | 1.18 | 106.6 | 0.884 | 1.028 | |
| Film 178 | 156 | 1.25 | 28 | −252.6 | 0.973 | 1.003 | 145.9 | 0.944 | 1.004 | −0.078 |
| Film 179 | 158 | 1.25 | 28 | −251.1 | 0.968 | 1.005 | 139.3 | 0.94 | 1.006 | −0.055 |
| Film 180 | 158 | 1.375 | 27 | −261.8 | 0.963 | 1.006 | 136.6 | 0.95 | 0.999 | −0.022 |
| Film 181 | 159 | 1.5 | 25 | −266.3 | 0.961 | 1.007 | 103.3 | 0.88 | 1.043 | 0.112 |

TABLE 39

Uniaxial Unconstrained Stretching of Film 56

| Film ID | ST (° C.) | ratio | d (μm) | Re550 nm | Re450/ Re550 | Re650/ Re550 | Rth550 | Rth450/ Rth550 | Rth650/ Rth550 | Nz |
|---|---|---|---|---|---|---|---|---|---|---|
| Film 56 | | | 38 | 0.4 | 0.918 | 1.02 | 95.2 | 0.899 | 1.028 | |
| Film 182 | 160 | 1.25 | 31 | −215.3 | 0.962 | 1.007 | 109.0 | 0.905 | 1.024 | −0.006 |
| Film 183 | 160 | 1.375 | 29 | −230.8 | 0.952 | 1.011 | 113.3 | 0.912 | 1.020 | 0.009 |
| Film 184 | 156 | 1.375 | 29 | −219.6 | 0.942 | 1.014 | 119.5 | 0.914 | 1.026 | −0.044 |
| Film 185 | 156 | 1.5 | 26 | −229.6 | 0.942 | 1.014 | 107.9 | 0.890 | 1.032 | 0.030 |

TABLE 40

Uniaxial Unconstrained Stretching of Film 57

| Film ID | ST (° C.) | ratio | d (μm) | Re550 nm | Re450/ Re550 | Re650/ Re550 | Rth550 | Rth450/ Rth550 | Rth650/ Rth550 | Nz |
|---|---|---|---|---|---|---|---|---|---|---|
| Film 57 | | | 36 | 0.3 | 0.999 | 0.957 | 84.8 | 0.901 | 1.026 | |
| Film 186 | 151 | 1.25 | 26 | −185 | 0.938 | 1.016 | 96.6 | 0.896 | 1.027 | −0.022 |
| Film 187 | 152 | 1.375 | 26 | −179.1 | 0.929 | 1.019 | 101.5 | 0.896 | 1.027 | −0.066 |
| Film 188 | 154 | 1.5 | 24 | −191.8 | 0.937 | 1.016 | 70.7 | 0.815 | 1.079 | 0.131 |

TABLE 41

Uniaxial Unconstrained Stretching of Film 58

| Film ID | ST (° C.) | ratio | d (μm) | Re550 nm | Re450/ Re550 | Re650/ Re550 | Rth550 | Rth450/ Rth550 | Rth650/ Rth550 | Nz |
|---|---|---|---|---|---|---|---|---|---|---|
| Film 58 | | | 37 | 0.3 | 0.877 | 1.009 | 87.9 | 0.891 | 1.032 | |
| Film 189 | 153 | 1.25 | 31 | −228.9 | 0.961 | 1.007 | 133.1 | 0.926 | 1.017 | −0.082 |
| Film 190 | 152 | 1.375 | 28 | −225.1 | 0.948 | 1.012 | 124.8 | 0.921 | 1.017 | −0.054 |
| Film 191 | 155 | 1.375 | 28 | −228.7 | 0.954 | 1.010 | 122.4 | 0.925 | 1.017 | −0.035 |

TABLE 42

Uniaxial Constrained and Unconstrained and Biaxial Stretching of Film 59

| Film ID | ST (° C.) | ratio | d (μm) | Re550 nm | Re450/ Re550 | Re650/ Re550 | Rth550 | Rth450/ Rth550 | Rth650/ Rth550 | Nz | b* | Haze % |
|---|---|---|---|---|---|---|---|---|---|---|---|---|
| Film 59 | | | 45 | 0.4 | 1.193 | 0.902 | 147.7 | 0.913 | 1.022 | | 1.14 | 0.53 |
| Film 192 | 150 | 1.25 | 43 | −211.3 | 0.996 | 0.994 | 134.0 | 0.922 | 1.010 | −0.134 | 1.08 | 1.11 |
| Film 193 | 150 | 1.5 | 39 | −332.5 | 0.996 | 0.995 | 179.5 | 0.947 | 0.999 | −0.040 | 0.99 | 1.25 |
| Film 194 | 150 | 1.75 | 34 | −323.6 | 0.989 | 0.997 | 172.5 | 0.943 | 1.003 | −0.033 | 0.9 | 0.81 |
| Film 195 | 150 | 1.5 × 1.0 | 31 | −150.1 | 0.995 | 0.994 | 142.3 | 0.916 | 1.019 | −0.450 | 0.85 | 0.65 |
| Film 196 | 150 | 1.3 × 1.3 | 29 | −6.5 | 0.971 | 1.012 | 119.3 | 0.866 | 1.037 | −18.0 | 0.79 | 0.64 |
| Film 197 | 160 | 1.5 | 38 | −241.9 | 0.985 | 0.998 | 113.6 | 0.890 | 1.019 | 0.030 | 0.95 | 1.26 |
| Film 199 | 160 | 1.75 | 32 | −275.5 | 0.984 | 0.999 | 128.0 | 0..917 | 1.011 | 0.036 | 0.87 | 1.1 |
| Film 199 | 160 | 2 | 28 | −303.3 | 0.992 | 0.995 | 140.7 | 0.941 | 1.012 | 0.036 | 0.95 | 1.68 |
| Film 200 | 160 | 2.25 | 27 | −318.8 | 0.992 | 0.996 | 138.6 | 0.953 | 0.996 | 0.065 | 1.38 | 5.7 |
| Film 201 | 160 | 1.5 × 1.0 | 29 | −114.8 | 1.001 | 0.992 | 104.7 | 0.898 | 1.026 | 0.412 | 0.82 | 0.72 |
| Film 202 | 160 | 1.3 × 1.3 | 31 | −1.8 | 0.961 | 1.007 | 107.1 | 0.868 | 1.039 | −60.16 | 0.86 | 0.4 |
| Film 203 | 160 | 1.5 | 36 | −237.4 | 0.990 | 0.996 | 113.9 | 0.906 | 1.022 | 0.020 | 0.97 | 1.01 |
| Film 204 | 160 | 1.5 | 34 | −245.7 | 0.990 | 0.996 | 121.3 | 0.913 | 1.016 | 0.006 | 0.91 | 0.78 |
| Film 205 | 170 | 1.5 | 42 | −255.4 | 1.000 | 0.993 | 124.6 | 0.967 | 0.993 | 0.012 | 1.14 | 1.02 |
| Film 206 | 170 | 1.75 | 39 | −305.6 | 1.004 | 0.991 | 147.6 | 0.996 | 0.979 | 0.017 | 1 | 0.71 |
| Film 207 | 170 | 2 | 38 | −374.7 | 1.010 | 0.988 | 178.0 | 1.000 | 0.979 | 0.025 | 1.17 | 1.05 |
| Film 208 | 170 | 2.25 | 33 | −357.8 | 0.808 | 1.046 | 381.2 | 1.02 | 0.801 | −0.566 | 1.23 | 1.73 |
| Film 209 | 170 | 1.5 × 1.0 | 32 | −106.2 | 1.004 | 0.991 | 94.94 | 0.89 | 1.029 | −0.394 | 0.99 | 0.5 |
| Film 210 | 170 | 1.3 × 1.3 | 30 | −8.6 | 1.017 | 0.983 | 88.28 | 0.867 | 1.038 | −9.728 | 0.88 | 0.55 |

Note:
Films 203 were stretched at a rate of 2%/s and 204 at 4%/s.

TABLE 43

Uniaxial Constrained and Unconstrained and Biaxial Stretching of Film 60

| Film ID | ST (° C.) | ratio | d (μm) | Re550 nm | Re450/ Re550 | Re650/ Re550 | Rth550 nm | Rth450/ Rth550 | Rth650/ Rth550 | Nz |
|---|---|---|---|---|---|---|---|---|---|---|
| Film 60 | | | 30 | 0.5 | 1.207 | 0.903 | 70.1 | 0.818 | 1.060 | |
| Film 211 | 150 | 1.5 | 28 | −193.7 | 0.952 | 1.011 | 99.79 | 0.871 | 1.031 | −0.015 |
| Film 212 | 150 | 1.75 | 27 | −192.3 | 0.942 | 1.015 | 94.21 | 0.829 | 1.047 | 0.010 |
| Film 213 | 150 | 1.5 × 1.0 | 25.5 | −102.8 | 0.971 | 1.004 | 86.71 | 0.828 | 1.055 | −0.343 |
| Film 214 | 150 | 1.3 × 1.3 | 23.3 | −7.801 | 0.977 | 0.999 | 78.14 | 0.785 | 1.074 | −9.516 |
| Film 215 | 160 | 1.5 | 26.3 | −150.1 | 0.995 | 0.994 | 164.2 | 0.975 | 1.002 | −0.594 |
| Film 216 | 160 | 1.75 | 27.5 | −215.7 | 0.977 | 1.001 | 93.94 | 0.876 | 1.029 | 0.064 |
| Film 217 | 160 | 1.5 × 1.0 | 21.6 | −73.4 | 0.983 | 0.999 | 59.94 | 0.807 | 1.058 | −0.317 |
| Film 218 | 160 | 1.3 × 1.3 | 19.6 | −6.7 | 0.976 | 1.004 | 54.47 | 0.759 | 1.077 | −7.596 |
| Film 219 | 160 | 1.4 × 1.4 | 17 | −8.6 | 0.974 | 1.004 | 50.84 | 0.752 | 1.082 | −5.441 |
| Film 220 | 170 | 1.5 | 30 | −152.6 | 0.977 | 1.001 | 104.7 | 0.898 | 1.026 | −0.186 |
| Film 221 | 170 | 2 | 25.1 | −203.2 | 0.980 | 1.000 | 66.81 | 0.854 | 1.038 | 0.171 |
| Film 222 | 170 | 1.5 × 1.0 | 26.5 | −73.5 | 0.983 | 0.999 | 52.29 | 0.740 | 1.085 | −0.211 |
| Film 223 | 170 | 1.75 × 1.0 | 19.2 | −93.7 | 0.985 | 0.997 | 50.26 | 0.762 | 1.077 | −0.036 |
| Film 224 | 170 | 2.0 × 1.0 | 19.4 | −114.8 | 0.990 | 0.996 | 54.55 | 0.776 | 1.067 | 0.025 |
| Film 225 | 170 | 1.4 × 1.4 | 21.2 | −3.3 | 0.952 | 1.014 | 44.65 | 0.695 | 1.107 | −12.99 |
| Film 226 | 170 | 1.5 × 1.5 | 19.2 | −2.1 | 0.919 | 1.021 | 41.88 | 0.688 | 1.109 | −19.48 |
| Film 227 | 170 | 1.6 × 1.6 | 16.6 | −6.3 | 0.972 | 1.004 | 38.54 | 0.667 | 1.11 | −5.606 |
| Film 228 | 170 | 1.7 × 1.7 | 15.8 | −7.2 | 0.982 | 0.999 | 34.83 | 0.621 | 1.132 | −4.368 |

TABLE 44

| Uniaxial Constrained and Unconstrained and Biaxial Stretching of film 61 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 61 | | | 34 | 0.5 | 1.259 | 0.893 | 56.3 | 0.707 | 1.101 | |
| Film 229 | 150 | 1.5 | 29.4 | −130.1 | 0.938 | 1.016 | 53.92 | 0.703 | 1.090 | 0.086 |
| Film 230 | 150 | 1.25 | 30.1 | −114.3 | 0.958 | 1.008 | 52.03 | 0.635 | 1.110 | 0.045 |
| Film 231 | 150 | 1.5 × 1.0 | 27.6 | −81.7 | 0.949 | 1.010 | 51.04 | 0.637 | 1.133 | −0.125 |
| Film 232 | 150 | 1.3 × 1.3 | 21.2 | −4.8 | 0.904 | 1.031 | 40.79 | 0.576 | 1.150 | −7.95 |
| Film 233 | 160 | 1.5 | 25.5 | −145.8 | 0.953 | 1.008 | 57.3 | 0.743 | 1.074 | 0.107 |
| Film 234 | 160 | 1.75 | 28 | −166.8 | 0.955 | 1.009 | 63.84 | 0.787 | 1.059 | 0.117 |
| Film 235 | 160 | 1.5 × 1.0 | 24.5 | −66.7 | 0.958 | 1.007 | 34.96 | 0.567 | 1.154 | −0.024 |
| Film 236 | 160 | 1.3 × 1.3 | 21.5 | −2.2 | 1.048 | 0.972 | 29.14 | 0.481 | 1.187 | −12.71 |
| Film 237 | 160 | 1.4 × 1.4 | 20.5 | −2.8 | 1.048 | 0.973 | 27.52 | 0.396 | 1.214 | −9.472 |
| Film 238 | 160 | 1.5 × 1.5 | 19.8 | −5.7 | 0.934 | 1.020 | 25.35 | 0.304 | 1.253 | −3.958 |
| Film 239 | 170 | 1.5 | 29.2 | −123.3 | 0.956 | 1.009 | 45.54 | 0.768 | 1.069 | 0.131 |
| Film 240 | 170 | 2 | 25 | −153.9 | 0.966 | 1.003 | 59.85 | 0.817 | 1.058 | 0.111 |
| Film 241 | 170 | 1.5 × 1.0 | 21.9 | −49.6 | 0.958 | 1.009 | 21.51 | 0.396 | 1.207 | 0.067 |
| Film 242 | 170 | 2.0 × 1.0 | 19.3 | −95.1 | 0.975 | 1.002 | 30.25 | 0.509 | 1.160 | 0.182 |
| Film 243 | 170 | 1.5 × 1.5 | 18.9 | −3.9 | 1.014 | 0.988 | 16.41 | 0.116 | 1.310 | −3.723 |
| Film 244 | 170 | 1.6 × 1.6 | 17.6 | −2.4 | 0.991 | 0.992 | 16.12 | 0.020 | 1.387 | −6.176 |

TABLE 45

| Uniaxial Constrained and Unconstrained and Biaxial Stretching of film 62 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 62 | | | 37 | 0.4 | 1.178 | 0.907 | 149.8 | 0.958 | 1.004 | |
| Film 245 | 170 | 1.5 | 35 | −201.1 | 1.014 | 0.987 | 115.0 | 0.985 | 0.992 | −0.072 |
| Film 246 | 170 | 1.75 | 28 | −246.4 | 1.014 | 0.987 | 127.7 | 0.992 | 0.987 | −0.018 |
| Film 247 | 170 | 2 | 27 | −303.4 | 1.016 | 0.987 | 149.9 | 1.012 | 0.975 | 0.006 |
| Film 248 | 170 | 2.25 | 25 | −284.6 | 1.013 | 0.987 | 145.2 | 1.005 | 0.985 | −0.010 |
| Film 249 | 170 | 1.5 × 1.0 | 29 | −94.05 | 1.016 | 0.987 | 101.9 | 0.944 | 1.010 | −0.583 |
| Film 250 | 170 | 1.3 × 1.3 | 27 | 18.98 | 1.020 | 0.985 | 99.49 | 0.925 | 1.020 | 5.742 |
| Film 251 | 160 | 1.5 | 34 | −268.7 | 1.013 | 0.988 | 151.6 | 1.002 | 0.983 | −0.064 |
| Film 252 | 160 | 1.75 | 29 | −290.3 | 1.010 | 0.989 | 290.3 | 1.010 | 0.989 | −0.500 |
| Film 253 | 160 | 2 | 28 | −329.1 | 1.010 | 0.989 | 172.4 | 0.991 | 0.987 | −0.024 |
| Film 254 | 160 | 2.25 | 29 | −363.8 | 1.009 | 0.989 | 184.2 | 1.014 | 0.971 | −0.006 |
| Film 255 | 160 | 1.5 × 1.0 | 31 | −121.4 | 1.015 | 0.986 | 130.6 | 0.961 | 1.002 | −0.576 |
| Film 256 | 160 | 1.3 × 1.3 | 30 | −35.27 | 1.005 | 0.99 | 130.2 | 0.933 | 1.014 | −3.192 |
| Film 257 | 150 | 1.5 | 36 | −265.3 | 0.987 | 0.998 | 185.0 | 0.996 | 0.982 | −0.197 |

TABLE 46

| Uniaxial Constrained and Unconstrained and Biaxial Stretching of film 63 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 63 | | | 30 | 0.5 | 1.156 | 0.907 | 100.9 | 0.875 | 1.035 | |
| Film 258 | 150 | 1.3 × 1.3 | 23.9 | −1.8 | 0.946 | 1.019 | 107.7 | 0.855 | 1.042 | −58.81 |
| Film 259 | 150 | 1.4 × 1.4 | 21.2 | −16.39 | 0.969 | 1.004 | 95.89 | 0.843 | 1.053 | −5.351 |
| Film 260 | 160 | 1.4 × 1.4 | 20.1 | −3.7 | 1.024 | 0.981 | 82.85 | 0.849 | 1.046 | −21.67 |
| Film 261 | 180 | anneal | 33 | −2.9 | 0.972 | 1.003 | 34.89 | 0.715 | 1.096 | −11.51 |
| Film 262 | 160 | 1.5 | 26.3 | −202.8 | 0.990 | 0.996 | 118.9 | 0.920 | 1.016 | −0.086 |
| Film 263 | 160 | 1.5 × 1.0 | 26.2 | −141.6 | 0.994 | 0.995 | 107.1 | 0.890 | 1.025 | −0.256 |

Note:
film 261 was put into heat chamber to anneal without any stretching.

TABLE 47

| Uniaxial Constrained and Unconstrained and Biaxial Stretching of film 64 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 64 | | | 34 | 0.4 | 1.303 | 0.867 | 99.99 | 0.868 | 1.034 | |
| Film 264 | 150 | 1.3 × 1.3 | 25.3 | −5.0 | 0.976 | 1.000 | 94.8 | 0.827 | 1.052 | −18.35 |
| Film 265 | 150 | 1.4 × 1.4 | 23.9 | −52.26 | 0.978 | 1.001 | 88.69 | 0.818 | 1.058 | −1.197 |
| Film 266 | 160 | 1.4 × 1.4 | 20.7 | −11.94 | 0.973 | 1.003 | 71.7 | 0.819 | 1.061 | −5.504 |
| Film 267 | 180 | anneal | 31.4 | −1.119 | 0.952 | 1.005 | 27.22 | 0.634 | 1.13 | −23.82 |
| Film 268 | 160 | 1.5 | 24.1 | −154.5 | 0.979 | 1.001 | 79.64 | 0.887 | 1.028 | −0.015 |
| Film 269 | 160 | 1.5 × 1.0 | 23.9 | −88.78 | 0.986 | 0.998 | 80.01 | 0.865 | 1.036 | −0.401 |

Note:
film 267 was put into heat chamber to anneal without any stretching.

TABLE 48

| Uniaxial Constrained and Unconstrained and Biaxial Stretching of film 65 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 65 | | | 44 | 0.7 | 0.847 | 1.025 | 54.02 | 0.528 | 1.162 | |
| Film 270 | 160 | 2 | 26.2 | −142.7 | 0.902 | 1.030 | 41.86 | 0.582 | 1.135 | 0.207 |
| Film 271 | 170 | 2 | 28.2 | −158.5 | 0.942 | 1.015 | 56.8 | 0.787 | 1.060 | 0.142 |
| Film 272 | 170 | 2.5 | 26 | −181.5 | 0.954 | 1.010 | 65.33 | 0.843 | 1.096 | 0.140 |
| Film 273 | 170 | 2.0 × 1.0 | 21.7 | −71.11 | 0.936 | 1.015 | 10.59 | −0.56 | 1.536 | 0.351 |
| Film 274 | 180 | anneal | 40.5 | 1.4 | 0.893 | 1.033 | −0.601 | 24.63 | −7.703 | 0.080 |
| Film 275 | 160 | 1.5 | 32.5 | −117.2 | 0.913 | 1.025 | 31.17 | 0.406 | 1.194 | 0.234 |
| Film 276 | 160 | 1.5 × 1.0 | 31.7 | −81.12 | 0.937 | 1.015 | 36.19 | 0.477 | 1.189 | 0.054 |
| Film 277 | 160 | 1.75 | 33.2 | −147.5 | 0.935 | 1.017 | 51.11 | 0.685 | 1.096 | 0.153 |
| Film 278 | 160 | 1.25 | 38 | −74.5 | 0.933 | 1.016 | 20.85 | 0.333 | 1.216 | 0.220 |

Note:
film 274 was put into heat chamber to anneal without any stretching.

TABLE 49

| Biaxial Stretching of film 66 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 66 | | | 32 | 0.4 | 1.200 | 0.880 | 118.7 | 0.933 | 1.015 | |
| Film 279 | 145 | 1.3 × 1.3 | 18.9 | −4.3 | 0.982 | 0.998 | 97.28 | 0.875 | 1.038 | −22.28 |
| Film 280 | 150 | 1.4 × 1.4 | 18.7 | −6.6 | 1.002 | 0.994 | 82.17 | 0.847 | 1.055 | −11.95 |
| Film 281 | 150 | 1.3 × 1.3 | 21.9 | −1.8 | 1.013 | 0.984 | 90.88 | 0.871 | 1.041 | −50.45 |
| Film 282 | 160 | 1.4 × 1.4 | 16.5 | −1.1 | 1.135 | 0.941 | 64.64 | 0.831 | 1.051 | −56.99 |
| Film 283 | 160 | 1.5 × 1.5 | 13.4 | −7.6 | 1.019 | 0.984 | 51.24 | 0.816 | 1.057 | −6.238 |
| Film 284 | 170 | 1.5 × 1.5 | 14.9 | −0.8 | 1.203 | 0.922 | 45.65 | 0.783 | 1.075 | −56.19 |

TABLE 50

| Biaxial Stretching of film 67 | | | | | | | | | |
|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 |
| Film 67 | | | 33.5 | 0.734 | 1.093 | 0.946 | 104.4 | 0.886 | 1.032 |
| Film 285 | 150 | 1.2 × 1.2 | 25.7 | −5.399 | 0.984 | 0.999 | 69.53 | 0.808 | 1.070 |
| Film 286 | 150 | 1.3 × 1.3 | 21.0 | −1.572 | 1.094 | 0.948 | 78.42 | 0.811 | 1.069 |
| Film 287 | 150 | 1.2 × 1.2 | 23.5 | −2.387 | 1.016 | 0.987 | 74.09 | 0.818 | 1.066 |
| Film 288 | 160 | 1.3 × 1.3 | 19.7 | −2.873 | 1.051 | 0.971 | 55.44 | 0.775 | 1.089 |
| Film 289 | 160 | 1.4 × 1.4 | 17.3 | −3.738 | 1.040 | 0.981 | 50.05 | 0.746 | 1.085 |

TABLE 51

| Biaxial Stretching of film 68 | | | | | | | | | |
|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 |
| Film 68 | | | 40.3 | 0.5 | 1.226 | 0.878 | 173.2 | 0.974 | 0.992 |
| Film 290 | 150 | 1.2 × 1.2 | 27 | −8.8 | 0.989 | 0.996 | 149.1 | 0.947 | 1.005 |
| Film 291 | 150 | 1.3 × 1.3 | 21.6 | −2.4 | 0.987 | 0.994 | 120.2 | 0.891 | 1.026 |
| Film 292 | 160 | 1.3 × 1.3 | 22.2 | −2.4 | 1.022 | 0.985 | 105.0 | 0.910 | 1.020 |
| Film 293 | 160 | 1.4 × 1.4 | 18.6 | −4.7 | 1.001 | 0.994 | 91.37 | 0.875 | 1.035 |

TABLE 52

| Uniaxial Constrained and Unconstrained Stretching of film 69 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 69 | | | 37 | 0.5 | 1.259 | 0.837 | 70.7 | 0.762 | 1.079 | |
| Film 294 | 150 | 1.75 | 30.6 | −198.3 | 0.966 | 1.006 | 81.17 | 0.859 | 1.037 | 0.091 |
| Film 295 | 150 | 2 | 27.4 | −210.0 | 0.974 | 1.002 | 82.27 | 0.884 | 1.029 | 0.108 |
| Film 296 | 150 | 1.75 × 1.0 | 18.6 | −81.33 | 0.965 | 1.006 | 31.88 | 0.560 | 1.122 | 0.108 |
| Film 297 | 160 | 1.75 × 1.0 | 20.9 | −79.85 | 0.985 | 0.998 | 30.32 | 0.563 | 1.124 | 0.120 |
| Film 298 | 160 | 2.0 × 1.0 | 18.8 | −70.98 | 0.984 | 0.998 | 22.42 | 0.470 | 1.173 | 0.184 |
| Film 299 | 160 | 1.9 × 1.0 | 18.2 | −86.02 | 0.991 | 0.995 | 30.81 | 0.547 | 1.145 | 0.142 |
| Film 300 | 160 | 2.25 | 29.7 | −237.1 | 0.992 | 0.996 | 92.53 | 0.936 | 1.011 | 0.110 |
| Film 301 | 170 | 1.75 × 1.0 | 21.8 | −76.4 | 0.990 | 0.997 | 21.97 | 0.424 | 1.193 | 0.212 |
| Film 302 | 170 | 2.0 × 1.0 | 19.1 | −87.8 | 0.995 | 0.994 | 21.82 | 0.431 | 1.194 | 0.252 |
| Film 303 | 170 | 2.25 × 1.0 | 15.9 | −85.05 | 0.984 | 0.998 | 16.39 | 0.259 | 1.268 | 0.307 |
| Film 304 | 180 | 1.75 × 1.0 | 20 | −51.84 | 0.964 | 1.006 | −0.1 | 97.55 | −33.21 | 0.503 |
| Film 305 | 180 | 2.00 × 1.0 | 17 | −82.46 | 0.981 | 0.999 | 16.68 | 0.169 | 1.285 | 0.298 |
| Film 306 | 180 | 2.25 × 1.0 | 14.8 | −72.84 | 0.980 | 1.000 | 5.4 | −1.359 | 1.832 | 0.426 |

TABLE 53

| Uniaxial Constrained and Unconstrained and Biaxial Stretching of Film 70 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 70 | | | 34 | 0.4 | 1.385 | 0.849 | 10.13 | −0.77 | 1.640 | |
| Film 307 | 140 | 1.5 | 28.5 | −62.73 | 0.755 | 1.086 | 8.2 | −0.998 | 1.729 | 0.369 |
| Film 308 | 140 | 2 | 25.1 | −81.05 | 0.745 | 1.081 | 18.9 | 0.087 | 1.311 | 0.267 |
| Film 309 | 140 | 1.3 × 1.3 | 18.8 | 1.3 | 0.954 | 0.997 | −5.1 | 4.400 | −0.226 | −3.386 |
| Film 310 | 140 | 1.4 × 1.4 | 17.9 | −2.7 | 1.409 | 0.769 | 58.47 | 0.542 | 1.152 | −21.42 |
| Film 311 | 150 | 1.5 × 1.5 | 15.5 | 0.9 | 1.115 | 0.915 | −14.35 | 2.153 | 0.623 | −16.05 |
| Film 312 | 160 | 2.25 × 1 | 15.9 | 14.48 | 0.551 | 1.145 | −20.28 | 1.722 | 0.737 | −0.900 |
| Film 313 | 160 | 2.0 × 1.0 | 16.4 | 24.14 | 0.714 | 1.100 | −14.16 | 2.033 | 0.614 | −0.087 |

TABLE 54

| Uniaxial Constrained and Unconstrained Stretching of Film 71 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 71 | | | 32.5 | 0.4 | 1.354 | 0.860 | 29.12 | 0.441 | 1.202 | |
| Film 314 | 150 | 1.5 | 32.8 | −72.52 | 0.765 | 1.074 | 21.21 | 0.353 | 1.222 | 0.207 |
| Film 315 | 150 | 2 | 30 | −110.2 | 0.821 | 1.054 | 41.17 | 0.648 | 1.115 | 0.126 |
| Film 316 | 150 | 2.3 | 28 | −122.3 | 0.842 | 1.047 | 46.99 | 0.715 | 1.084 | 0.116 |
| Film 317 | 150 | 2.6 | 26.9 | −134.2 | 0.860 | 1.046 | 53.95 | 0.793 | 1.045 | 0.098 |
| Film 318 | 160 | 2 | 30.2 | −84.56 | 0.797 | 1.070 | 31.25 | 0.588 | 1.143 | 0.130 |
| Film 319 | 160 | 2.3 | 30.9 | −105.7 | 0.822 | 1.053 | 39.18 | 0.677 | 1.110 | 0.129 |
| Film 320 | 160 | 2.6 | 29.4 | −115.7 | 0.845 | 1.046 | 44.48 | 0.727 | 1.084 | 0.116 |
| Film 321 | 160 | 2.6 | 30.4 | −110.1 | 0.842 | 1.050 | 44.32 | 0.719 | 1.115 | 0.097 |

TABLE 54-continued

| Uniaxial Constrained and Unconstrained Stretching of Film 71 | | | | | | | | | | | |
|---|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 322 | 160 | 2.8 | 26.4 | −114.1 | 0.858 | 1.047 | 44.82 | 0.761 | 1.075 | 0.107 |
| Film 323 | 160 | 2.1 × 1.0 | 18.1 | −47.5 | 0.858 | 1.047 | 1.427 | −9.641 | 4.847 | 0.470 |
| Film 324 | 160 | 1.75 × 1 | 20.8 | −29.87 | 0.797 | 1.071 | −3.901 | 5.069 | −0.465 | 0.631 |

TABLE 55

| Uniaxial Constrained and Unconstrained Stretching of Film 72 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 | Rth450/ Rth550 | Rth650/ Rth550 | Nz |
| Film 72 | | | 41.4 | 0.13 | 0.390 | 1.158 | 56.94 | 0.597 | 1.116 | |
| Film 325 | 150 | 1.5 | 30.6 | −159.0 | 0.957 | 1.009 | 58.29 | 0.721 | 1.062 | 0.133 |
| Film 326 | 160 | 1.5 | 33.3 | −171.1 | 0.985 | 0.998 | 67.47 | 0.881 | 1.008 | 0.106 |
| Film 327 | 160 | 2 | 27.8 | −217.3 | 0.979 | 1.000 | 86.58 | 0.922 | 0.991 | 0.101 |
| Film 328 | 170 | 1.75 × 1.0 | 20.9 | −82.75 | 0.986 | 0.998 | 15.27 | −0.101 | 1.330 | 0.315 |
| Film 329 | 170 | 2.0 × 1.0 | 17.8 | −88.19 | 0.989 | 0.995 | 10.93 | −0.496 | 1.472 | 0.376 |
| Film 330 | 180 | 1.75 × 1.0 | 20 | −63.34 | 0.983 | 0.998 | −1.751 | 10.93 | −2.351 | 0.528 |
| Film 331 | 180 | 2.00 × 1.0 | 16.8 | −73.84 | 0.987 | 0.998 | −0.813 | 20.46 | −5.601 | 0.511 |
| Film 332 | 180 | 2.25 × 1.0 | 16.4 | −85.36 | 0.989 | 0.997 | −0.263 | 62 | −19.82 | 0.503 |

TABLE 56

| Uniaxial Constrained and Unconstrained and Stretching of Film 73 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 73 | | | 59 | 0.6 | 1.226 | 0.89 | 121.6 | 0.832 | 1.048 | |
| Film 333 | 175 | 1.75 × 1.0 | 30.6 | −81.29 | 0.989 | 0.996 | 13.93 | −0.244 | 1.405 | 0.329 |
| Film 334 | 175 | 2.0 × 1.0 | 26.5 | −100.2 | 0.997 | 0.994 | 13.58 | −0.339 | 1.445 | 0.364 |
| Film 335 | 180 | 2.0 × 1.0 | 27 | −84.92 | 0.983 | 0.998 | 3.5 | −4.151 | 2.847 | 0.459 |
| Film 336 | 180 | 2.25 × 1.0 | 27.8 | −90.06 | 0.983 | 0.999 | 3.8 | −3.338 | 2.568 | 0.457 |
| Film 337 | 180 | 2.50 × 1.0 | 20.9 | −97.99 | 0.983 | 0.999 | 3.0 | −4.696 | 2.978 | 0.469 |
| Film 338 | 180 | 2 | 51.8 | −227.2 | 1.002 | 0.992 | 98.5 | 0.992 | 0.978 | 0.066 |
| Film 339 | 180 | 2.5 | 49.9 | −260.9 | 1.005 | 0.991 | 108.9 | 1.002 | 0.974 | 0.083 |
| Film 340 | 185 | 2.00 × 1.0 | 24.9 | −66.69 | 0.958 | 1.008 | −6.7 | 3.616 | 0.032 | 0.601 |
| Film 341 | 185 | 2.25 × 1.0 | 16.4 | −76.23 | 0.958 | 1.009 | −10.52 | 2.867 | 0.328 | 0.638 |
| Film 342 | 185 | 2.5 × 1.0 | 24.2 | −83.71 | 0.956 | 1.009 | −10.0 | 2.945 | 0.298 | 0.619 |
| Film 343 | 185 | 2.25 × 1.0 | 25.2 | −74.11 | 0.952 | 1.01 | −7.265 | 3.569 | 0.033 | 0.598 |
| Film 344 | 185 | 2.25 × 1.0 | 24.7 | −76.81 | 0.952 | 1.009 | −3.228 | 6.837 | −1.071 | 0.542 |

Note:
Film 343 was stretched at a rate of 3%/s, and 44 at a rate of 7%/s.

TABLE 57

| Uniaxial Constrained Stretching of Film 74 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 74 | | | 68 | 0.7 | 1.097 | 0.946 | 107.8 | 0.858 | 1.039 | |
| Film 345 | 170 | 2.0 × 1.0 | 42.8 | −180.8 | 1.024 | 0.984 | 51.01 | 0.581 | 1.126 | 0.218 |
| Film 346 | 175 | 2.0 × 1.0 | 36.3 | −148.4 | 1.013 | 0.988 | 21.86 | −0.040 | 1.345 | 0.353 |
| Film 347 | 180 | 2.0 × 1.0 | 36.1 | −132.4 | 1.007 | 0.990 | 4.7 | −4.126 | 2.798 | 0.465 |
| Film 348 | 180 | 2.25 × 1.0 | 35.9 | −128.3 | 1.001 | 0.993 | −9.7 | 3.646 | 0.043 | 0.576 |
| Film 349 | 180 | 2.25 × 1.0 | 31.3 | −140.8 | 1.005 | 0.991 | −1.3 | 17.98 | −5.059 | 0.510 |
| Film 350 | 185 | 2.0 × 1.0 | 36.3 | −104.9 | 0.988 | 0.997 | −19.06 | 2.368 | 0.497 | 0.682 |
| Film 351 | 185 | 2.25 × 1.0 | 34.3 | −102.1 | 0.978 | 1.001 | −24.27 | 2.074 | 0.603 | 0.738 |
| Film 352 | 185 | 2.50 × 1.0 | 32.3 | −107.2 | 0.972 | 1.003 | −24.17 | 2.048 | 0.616 | 0.726 |

TABLE 58

| Uniaxial Constrained Stretching of Film 75 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 75 | | | 68 | 0.6 | 1.305 | 0.859 | 127.6 | 0.915 | 1.022 | |
| Film 353 | 175 | 2.00 × 1.0 | 34.3 | −160.6 | 1.018 | 0.986 | 35.24 | 0.417 | 1.191 | 0.281 |
| Film 354 | 175 | 2.25 × 1.0 | 36.2 | −152.2 | 1.022 | 0.984 | 19.99 | −0.035 | 1.331 | 0.369 |
| Film 355 | 180 | 2.0 × 1.0 | 36.5 | −141.5 | 1.014 | 0.987 | 12.59 | −0.838 | 1.626 | 0.411 |
| Film 356 | 180 | 2.25 × 1.0 | 33.4 | −140.7 | 1.010 | 0.989 | 4.1 | −4.602 | 2.977 | 0.471 |
| Film 357 | 180 | 2.50 × 1.0 | 27.7 | −150.0 | 1.013 | 0.988 | 11.66 | −0.736 | 1.603 | 0.422 |
| Film 358 | 185 | 2.0 × 1.0 | 33.5 | −109.4 | 0.997 | 0.994 | −8.3 | 3.788 | 0.006 | 0.576 |
| Film 359 | 185 | 2.25 × 1.0 | 34.8 | −112.6 | 0.986 | 0.998 | −16.33 | 2.552 | 0.438 | 0.645 |
| Film 360 | 185 | 2.50 × 1.0 | 26.7 | −121.8 | 0.993 | 0.995 | −6.71 | 4.223 | −0.150 | 0.555 |

TABLE 59

| Uniaxial Constrained Stretching of Film 76 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 76 | | | 71 | 0.7 | 1.222 | 0.901 | 125.7 | 0.874 | 1.036 | |
| Film 361 | 170 | 2.0 × 1.0 | 47 | −91.45 | 1.011 | 0.988 | 26.2 | 0.804 | 1.064 | 0.213 |
| Film 362 | 175 | 2.0 × 1.0 | 40.8 | −146.9 | 1.015 | 0.987 | 9.6 | −1.707 | 1.909 | 0.434 |
| Film 363 | 180 | 2.0 × 1.0 | 32.6 | −114.2 | 1.001 | 0.992 | −6.9 | 4.374 | −0.226 | 0.560 |
| Film 364 | 180 | 2.25 × 1.0 | 36.5 | −122.5 | 1.000 | 0.993 | −15.45 | 2.653 | 0.399 | 0.626 |
| Film 365 | 180 | 2.50 × 1.0 | 29.5 | −133.5 | 1.003 | 0.991 | −9.6 | 3.491 | 0.097 | 0.572 |
| Film 366 | 185 | 2.0 × 1.0 | 33.3 | −84.33 | 0.971 | 1.004 | −28.74 | 1.878 | 0.677 | 0.841 |
| Film 367 | 185 | 2.25 × 1.0 | 36 | −88.18 | 0.960 | 1.008 | −36.3 | 1.741 | 0.721 | 0.912 |
| Film 368 | 185 | 2.50 × 1.0 | 29.9 | −94.03 | 0.967 | 1.006 | −28.45 | 1.858 | 0.680 | 0.803 |

TABLE 60

| Uniaxial Constrained and Unconstrained and Biaxial Stretching of Film 77 | | | | | | | | | | |
|---|---|---|---|---|---|---|---|---|---|---|
| Film ID | ST (° C.) | ratio | d (μm) | Re550 nm | Re450/ Re550 | Re550 Re650/ | Rth550 nm | Rth450/ Rth550 | Rth650/ Rth550 | Nz |
| Film 77 | | | 35.8 | 0.5 | 1.250 | 0.881 | 70.88 | 0.816 | 1.055 | |
| Film 369 | 145 | 1.5 | 35.7 | −176.0 | 0.971 | 1.004 | 79.27 | 0.866 | 1.033 | 0.049 |
| Film 370 | 145 | 1.75 | 31.8 | −197.0 | 0.971 | 1.003 | 85.15 | 0.884 | 1.025 | 0.068 |
| Film 371 | 145 | 2 | 35.3 | −257.3 | 0.970 | 1.003 | 107.4 | 0.874 | 1.043 | 0.083 |
| Film 372 | 145 | 2.2 | 29 | −234.7 | 0.968 | 1.005 | 97.45 | 0.920 | 1.009 | 0.085 |
| Film 373 | 155 | 1.5 | 35.7 | −158.4 | 0.974 | 1.003 | 71.55 | 0.888 | 1.024 | 0.048 |
| Film 374 | 155 | 2 | 31.4 | −219.0 | 0.987 | 0.997 | 93.36 | 0.933 | 1.010 | 0.074 |
| Film 375 | 155 | 1.5 × 1 | 19.8 | −48.7 | 0.973 | 1.003 | 32.18 | 0.694 | 1.108 | −0.161 |
| Film 376 | 155 | 1.3 × 1.3 | 21.6 | −2.2 | 1.053 | 0.970 | 31.65 | 0.600 | 1.153 | −13.94 |
| Film 377 | 165 | 1.5 × 1 | 23 | −53.2 | 0.979 | 1.000 | 26.53 | 0.579 | 1.148 | 1E−03 |
| Film 378 | 165 | 1.75 × 1 | 20.3 | −62.2 | 0.983 | 0.998 | 21.73 | 0.490 | 1.153 | 0.151 |

TABLE 61

| Uniaxial Constrained and Unconstrained and Biaxial Stretching of Film 78 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 78 | | | 41.8 | 0.6 | 1.045 | 0.973 | 111.4 | 0.881 | 1.036 | |
| Film 379 | 145 | 1.5 | 35.1 | −202.6 | 0.990 | 0.996 | 97.5 | 0.922 | 1.011 | 0.019 |
| Film 380 | 145 | 1.75 | 33.1 | −248.8 | 0.986 | 0.997 | 115.1 | 0.932 | 1.008 | 0.038 |
| Film 381 | 145 | 2 | 34.2 | −304.1 | 0.989 | 0.997 | 137.3 | 0.957 | 0.998 | 0.049 |
| Film 382 | 155 | 1.5 | 43.4 | −221.4 | 0.998 | 0.993 | 107.7 | 0.953 | 1.004 | 0.014 |
| Film 383 | 155 | 2 | 34.5 | −278.8 | 1.003 | 0.992 | 125.0 | 0.977 | 0.993 | 0.052 |
| Film 384 | 155 | 2.5 | 33.5 | −332.4 | 1.009 | 0.989 | 144.5 | 0.990 | 0.982 | 0.065 |

TABLE 61-continued

| Uniaxial Constrained and Unconstrained and Biaxial Stretching of Film 78 | | | | | | | | | | |
|---|---|---|---|---|---|---|---|---|---|---|
| Film ID | ST (° C.) | ratio | d (μm) | Re550 nm | Re450/ Re550 | Re650/ Re550 | Rth550 nm | Rth450/ Rth550 | Rth650/ Rth550 | Nz |
| Film 385 | 155 | 1.5 × 1 | 25.7 | −80.58 | 0.996 | 0.994 | 60.57 | 0.823 | 1.054 | −0.252 |
| Film 386 | 155 | 1.3 × 1.3 | 24 | −1.7 | 0.934 | 1.013 | 55.3 | 0.780 | 1.076 | −31.92 |
| Film 387 | 165 | 1.5 × 1 | 26.3 | −71.77 | 0.998 | 0.993 | 47.5 | 0.789 | 1.069 | −0.162 |
| Film 388 | 165 | 1.75 × 1 | 20.5 | −82.2 | 1.004 | 0.991 | 41.42 | 0.767 | 1.074 | −0.004 |

Example 14. Films of PI-PMMA/PTFS/PMMA Blend and the Stretching

As shown in Examples 12 and 13, when the PMMA/PI ratio was varied in the PI-PMMA block copolymer, the blending ratio with PTFS had to be adjusted to reach the desired properties. For example, PI-PMMA with a 1:2 weight ratio behaves very differently than PI-PMMA with a 1:4 weight ratio. It was also discovered that PMMA homo polymer could be added to form three-component blends with PI-PMMA and PTFS solutions of these blends that could be cast into clear films. The optical properties of films of these three component blends are listed in Table 62. Film 389 was prepared from PI-PMMA (Polymer 56, PI-PMMA 1:2.1 based on yield) with PMMA homo polymer and PTFS at a PI-PMMA/PMMA/PTFS weight ratio of 39.2/24.2/36.6.

TABLE 62

| Uniaxial Constrained and Unconstrained Stretching of Film 389 | | | | | | | | |
|---|---|---|---|---|---|---|---|---|
| Film ID | ST (° C.) | Ratio | d (um) | Re550 nm | Re450/ Re550 | Rth550 nm | Rth450/ Rth550 | Nz550 |
| Film 389 | | | 40 | | | 64.6 | 0.86 | |
| Film 390 | 150 | 1.75 | 34.2 | −175.5 | 0.99 | 80.5 | 0.93 | 0.04 |
| Film 391 | 155 | 2 | 36.3 | −212.8 | 1.00 | 97.2 | 0.97 | 0.04 |
| Film 392 | 155 | 2.3 | 34.1 | −232.0 | 1.00 | 102.5 | 0.98 | 0.06 |
| Film 393 | 155 | 2.5 | 35.7 | −253.2 | 1.00 | 109.1 | 0.99 | 0.07 |
| Film 394 | 155 | 1.7 × 1.0 | 23.4 | −71.8 | 1.00 | 46.6 | 0.83 | −0.15 |
| Film 395 | 155 | 2.0 × 1.0 | 21.5 | −89.0 | 1.00 | 53.8 | 0.83 | −0.10 |
| Film 396 | 160 | 2 | 33.9 | −183.7 | 1.00 | 82.8 | 0.95 | 0.05 |
| Film 397 | 160 | 2.5 | 31.1 | −213.8 | 1.00 | 99.5 | 0.99 | 0.03 |
| Film 398 | 160 | 1.7 × 1.0 | 24.3 | −65.1 | 1.00 | 40.0 | 0.78 | −0.11 |
| Film 399 | 160 | 2 × 1.0 | 21.4 | −77.5 | 1.00 | 33.3 | 0.78 | 0.07 |
| Film 400 | 160 | ~2.1 × 1.0 | 27.2 | −38.6 | 1.01 | 28.4 | 0.71 | −0.24 |
| Film 401 | 160 | 2.5 | 34.2 | 235.2 | 1.00 | 101.7 | 0.99 | 0.07 |

Example 15. Films of PI-PS and PI-PS/PS Blends

PI-PS formed compatible blends with PS that could be solution cast into clear RD C+ films (Table 63). Further stretching could lead to RD A−/B+ films. The birefringent contribution of PS is only 1/10 that of PTFS, but when thickness is not a significant concern, the low cost PS could be used.

TABLE 63

| Films of PI-PS/PS blend | | | | | | | | | |
|---|---|---|---|---|---|---|---|---|---|
| Film ID | PI-PS ID | PI-PS/PS weight ratio | d um | $Re^{550}$ | $Re^{450}/Re^{550}$ | $Re^{650}/Re^{550}$ | $Rth^{550}$ | $Rth^{450}/Rth^{550}$ | $Rth^{550}/Rth^{550}$ |
| Film 402 | Polymer 73 | 0/100 | 40 | 1.1 | 1.06 | 0.97 | 21.9 | 1.06 | 0.97 |
| Film 403 | Polymer 73 | 10/90 | 40 | 1.0 | 1.06 | 0.97 | 17.1 | 1.04 | 0.98 |
| Film 404 | Polymer 73 | 20/80 | 40 | 1.2 | 1.10 | 0.94 | 11.4 | 1.02 | 0.95 |
| Film 405 | Polymer 73 | 30/70 | 40 | 1.3 | 1.08 | 0.96 | 6.9 | 0.87 | 1.05 |
| Film 406 | Polymer 73 | 100/0 | 40 | 1.9 | 1.13 | 0.95 | −47.0 | 1.19 | 0.93 |

While particular examples above have been illustrated and described herein, it should be understood that various other changes and modifications may be made without departing from the spirit and scope of the claimed subject matter. Moreover, although various aspects of the claimed subject matter have been described herein, such aspects need not be utilized in combination. Accordingly, it will be appreciated that the above described examples should not be construed to narrow the scope or spirit of the disclosure in any way. Other examples, embodiments, aspects, and advantages will become apparent from the following detailed description taken in conjunction with the accompanying drawings. It is therefore intended that the appended claims cover all such changes and modifications that are within the scope of the claimed subject matter.

The invention claimed is:

1. An optical compensation film comprising a positive birefringent component and a negative birefringent component, with a thickness less than 200 μm, wherein the film is a Z film, wherein |Re.sup.550 nm|>50 nm, and |Rth.sup.550 mm|<Re.sup.550 μm|/2, which is obtained without any out-of-plane direction stretching, and wherein the positive birefringent component and the negative birefringent component are contained in a compatible blend.

2. The optical compensation film of claim 1 is a RD C+film, wherein Rth.sup.550 nm>50 nm, Rth.sup.450 nm/Rth.sup.550 nm<1.0, and Re.sup.550 nm<10 nm.

3. The optical compensation film of claim 1 is a RD A−/B+film, wherein |Re.sup.550 μm|>50 nm, Re.sup.450 nm/Re.sup.550 nm<1.0, and Rth.sup.550 μm>|Re.sup.550 nm|/2.

4. The optical compensation film of claim 1, wherein |Re.sup.550 mm|>50 nm, and |Rth.sup.550 mm|<10 nm.

5. The optical compensation film of claim 4, wherein |Re.sup.550 mm|>50 nm, and |Rth.sup.550 nm|<5 nm.

6. The optical compensation film of claim 4, wherein Re.sup.450 nm/Re.sup.550 nm>1.0.

7. The optical compensation film of claim 4, wherein Re.sup.450 mm/Re.sup.550 nm in the range of 0.98-1.02.

8. The optical compensation film of claim 4, wherein Re.sup.450 nm/Re.sup.550 nm<1.0.

9. The optical compensation film of claim 4, wherein Re.sup.450 nm/Re.sup.550 nm<0.9.

10. The optical compensation film of claim 4, wherein Re.sup.450 nm/Re.sup.550 nm<0.85.

11. The optical compensation film of claim 4, wherein Re.sup.450 nm/Re.sup.550 mm=0.82.

12. The optical compensation film of claim 1, wherein both the positive birefringent component and the negative birefringent component are contained in a copolymer.

13. The optical compensation film of claim 1, wherein the positive birefringent component is not compatible with the negative birefringent component, and a compatibilizing component is used to promote their homogenous blending.

14. The optical compensation film of claim 1 being comprised in a liquid crystal display (LCD).

15. The optical compensation film of claim 1 being comprised in an organic light emitting diode (OLED) display.

16. An optical compensation film comprising a compatible blend of a positive birefringent component, a negative birefringent component and a compatibilizing component.

17. The optical compensation film according to claim 16, further comprising a compatible blend of a copolymer of a negative birefringent component and a second component and a positive birefringent component.

18. The optical compensation film of claim 17, wherein the positive birefringent component is selected from PTFS, PS, PMMA or copolymers containing these moieties.

19. The optical compensation film of claim 18, wherein the positive birefringent component is PTFS or a copolymer containing PTFS.

20. The optical compensation film of claim 17, wherein the negative birefringent component is selected from PAR, PSU and PI, or copolymers containing these moieties.

21. The optical compensation film of 17, comprising a compatible blend of a copolymer of a negative birefringent component and a second component, a positive birefringent component, and a third compatible polymer component.

22. The optical compensation film of claim 17, wherein the negative birefringent component is PSU.

23. The optical compensation film of claim 20, wherein the negative birefringent component is PI.

24. The optical compensation film of claim 17, wherein the negative birefringent component is the PI 6FDA/PFMB.

25. The optical compensation film of claim 17, wherein the negative birefringent component is the PI 6FDA/BPDA/PFMB.

26. The optical compensation film of claim 17, wherein the positive birefringent component is PTFS, and the negative birefringent component is the PI 6FDA/BPDA/PFMB.

27. The optical compensation film of claim 17, wherein the positive birefringent component is selected from PMMA, PS and PTFS, and the copolymer containing the second component and the negative birefringent component is selected from PAR-PMMA, PAR-PS, PSU-PMMA, PSU-PS, PI-PMMA, and PI-PS.

28. The optical compensation film of claim 17, wherein the positive birefringent component is PTFS, and the copolymer containing the compatibilizing component and the negative birefringent component is PI-PMMA, with a PI structure of 6FDA/BPDA/PFMB.

* * * * *